US009152996B2

(12) United States Patent
Murphy et al.

(10) Patent No.: US 9,152,996 B2
(45) Date of Patent: *Oct. 6, 2015

(54) METHODS AND SYSTEM FOR VISUALLY DESIGNING TRADING STRATEGIES AND EXECUTION THEREOF

(71) Applicant: KnowVera, LLC, Danbury, CT (US)

(72) Inventors: Joseph Murphy, New Fairfield, CT (US); Stephen Kalayjian, Katonah, NY (US)

(73) Assignee: KnowVera, LLC, Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,885

(22) Filed: Mar. 21, 2014

(65) Prior Publication Data
US 2014/0297503 A1 Oct. 2, 2014

Related U.S. Application Data

(63) Continuation of application No. 13/100,213, filed on May 3, 2011, now Pat. No. 8,682,773.

(60) Provisional application No. 61/330,755, filed on May 3, 2010.

(51) Int. Cl.
G06Q 40/04 (2012.01)
G06Q 40/00 (2012.01)

(52) U.S. Cl.
CPC ............ *G06Q 40/04* (2013.01); *G06Q 40/00* (2013.01)

(58) Field of Classification Search
None
See application file for complete search history.

(56) References Cited

U.S. PATENT DOCUMENTS

| 8,682,773 | B1 | 3/2014 | Murphy et al. | |
|---|---|---|---|---|
| 2007/0192249 | A1* | 8/2007 | Biffle et al. | 705/44 |
| 2010/0299280 | A1 | 11/2010 | Lane et al. | |
| 2010/0312716 | A1 | 12/2010 | Lane et al. | |
| 2010/0312718 | A1* | 12/2010 | Rosenthal et al. | 705/36 R |
| 2011/0093378 | A1* | 4/2011 | Lane et al. | 705/37 |
| 2011/0093379 | A1 | 4/2011 | Lane et al. | |

* cited by examiner

*Primary Examiner* — Robert R Niquette
(74) *Attorney, Agent, or Firm* — Greenberg Traurig, LLP

(57) ABSTRACT

In one embodiment, the instant invention includes a computer-implemented method having steps of: providing a plurality of pre-programmed components; receiving an alert strategy, representing a strategy diagram made on a computer screen from the plurality of provided pre-programmed components; validating the alert strategy, where the validation includes generating, real-time, a smart chart for the alert strategy; receiving a selection of at least one trading instrument for which the alert strategy to be executed; executing the alert strategy for the trading instrument based, at least in part, on one of: i) historical market data and/or ii) real-time market data, where the execution of the at least one alert strategy automatically reflected in the generated smart chart; and generating a buy/sell alert when the execution of the alert strategy meets a condition pre-determined by the alert strategy.

21 Claims, 23 Drawing Sheets

FIG. 3

```
*** Compiling Strategy ***
Friday, April 16, 2010  12:00 AM

Compile Complete: Lowest Resolution is 30 M
  Verifing Node: 1: 30.30 Minutes
New Node Added: 1: 30.30 Minutes
  Walking from 30 Minutes to MovingAverage.
  Verifing Node: 2: 30.MovingAverage
New Node Added: 2: 30.MovingAverage
  Walking from MovingAverage to Cross Over Signal.
Walk complete for node: MovingAverage
  Walking from 30 Minutes to MovingAverage.
  Verifing Node: 3: 30.MovingAverage
New Node Added: 3: 30.MovingAverage
  Walking from MovingAverage to Cross Over Signal.
  Verifing Node: 4: 30.Cross Over Signal
New Node Added: 4: 30.Cross Over Signal
  Walking from Cross Over Signal to Buy Alert Signal.
```

| Symbol | Description | Asset T... | Average Volume | Beta | Info | Alias | Subscriber |
|---|---|---|---|---|---|---|---|
| Information Technology | | | | | | | |
| ☐ A | Agilent Technologies Inc | STOCK | 3303436 | 1.05 | Common Stock | A | ES_STK-A |
| ☑ AAPL | Apple Inc | STOCK | 21741788 | 0.94 | Common Stock ... | AAPL | ES_STK-A |
| ☐ AATI | Advanced Analogic Technologies Inc | STOCK | 867014 | 1.17 | Common Stock ... | AATI | ES_STK-A |
| ☐ ACIW | ACI Worldwide Inc | STOCK | 497561 | 1.09 | Common Stock ... | ACIW | ES_STK-A |
| ☐ ACLS | Axcelis Technologies Inc | STOCK | 404363 | 1.47 | Common Stock ... | ACLS | ES_STK-A |
| ☐ ACS | Affiliated Computer Services Inc | STOCK | 876367 | 0.68 | Class A Stock ... | ACS | ES_STK-A |
| ☐ ACTL | Actel Corp | STOCK | 254881 | 0.96 | Common Stock ... | ACTL | ES_STK-A |
| ☐ ACTU | Actuate Corp | STOCK | 427695 | 1.16 | Common Stock ... | ACTU | ES_STK-A |
| ☑ ADBE | Adobe Systems Inc | STOCK | 9334728 | 1.16 | Common Stock ... | ADBE | ES_STK-A |
| ☐ ADCT | ADC Telecommunications Inc | STOCK | 2272894 | 1.15 | Common Stock ... | ADCT | ES_STK-A |
| ☐ ADI | Analog Devices Inc | STOCK | 3975196 | 0.84 | Common Stock ... | ADI | ES_STK-A |
| ☑ ADP | Automatic Data Processing Inc | STOCK | 4536770 | 0.75 | Common Stock ... | ADP | ES_STK-A |
| ☐ ADPT | Adaptec Inc | STOCK | 1446356 | 0.99 | Common Stock ... | ADPT | ES_STK-A |
| ☑ ADSK | Autodesk Inc | STOCK | 3962695 | 1.1 | Common Stock ... | ADSK | ES_STK-A |
| ☐ ADTN | ADTRAN Inc | STOCK | 1442619 | 0.83 | Common Stock ... | ADTN | ES_STK-A |
| ☐ ADVS | Advent Software Inc | STOCK | 458150 | 1.04 | Common Stock ... | ADVS | ES_STK-A |
| ☐ AEIS | Advanced Energy Industries Inc | STOCK | 1094119 | 1.3 | Common Stock ... | AEIS | ES_STK-A |
| ☐ AGYS | Agilysys Inc | STOCK | 389508 | 1.67 | Common Stock ... | AGYS | ES_STK-A |
| ☐ AIRV | Airvana Inc | STOCK | 12487357 | 0.82 | Common Stock ... | AIRV | ES_STK-A |
| ☑ AKAM | Akamai Technologies Inc | STOCK | 9576889 | 1.21 | Common Stock ... | AKAM | ES_STK-A |
| ☐ ALTR | Altera Corp | STOCK | 5216191 | 0.9 | Common Stock ... | ALTR | ES_STK-A |

2396 items 6 selected

| Alert Date/Time | Side | Symbol | Strategy | Interval | Price | Bar Date/Time |
|---|---|---|---|---|---|---|
| 03/18/10 15:30:00 | Up Signal | WMT | Buy Alert | 30 Minute | 55.8800 | 03/18/10 15:30:00 |
| 04/07/10 15:00:00 | Down Signal | URBN | Sell Alert | 30 Minute | 38.5250 | 04/07/10 15:00:00 |

FIG. 14

$ Allocation Strategy Designer  New | Save

5 % Available funds

% of Available Funds ▼   Value: 0.05

| Name | Value1 |
|---|---|
| 5 % Available funds | 0.05 |
| Nifty Fifty | 50000 |
| test | 0 |
| New | 0 |

Symbol Master Editor  New | Save

| Symbol | Type | ContractSZ | PriceMult |
|---|---|---|---|
| @GC.1 | 2 | 100 | 1 |
| @SI.1 | 2 | 5000 | 0.01 |
| @ES.1 | 2 | 50 | 1 |
| @C.1 | 2 | 5000 | 0.01 |

FIG. 16

METHODS AND SYSTEM FOR VISUALLY DESIGNING TRADING STRATEGIES AND EXECUTION THEREOF

RELATED APPLICATIONS

This application claims the benefit of U.S. provisional application Ser. No. 61/330,755 filed May 3, 2010, entitled "METHODS AND SYSTEM FOR VISUAL DESIGNING OF TRADING STRATEGIES," which is hereby incorporated by reference herein in its entirety for all purposes.

TECHNICAL FIELD

The present invention relates to visual design of trading strategies and execution thereof.

BACKGROUND

Typically, designing a computer-based trading strategy requires from a financial professional to engage a programmer who writes software code to implement the trading strategy.

SUMMARY OF INVENTION

In some embodiments, the instant invention includes a computer-implemented method that includes steps of: providing, by a computer system, a plurality of pre-programmed components, wherein the plurality of pre-programmed components comprising at least one pre-programmed software component from each of the following types of pre-programmed components: i) a time series component, ii) a technical indicator component, and iii) an alert component, wherein each alert component represents either buy or sell opportunity; receiving, by a computer system, at least one alert strategy, wherein the at least one alert strategy represents a strategy diagram made on a computer screen from the plurality of provided pre-programmed components, having at least: i) at least one time series component, ii) at least one technical indicator component, and iii) at least one alert component; validating, by a computer system, the at least one alert strategy, wherein the validation includes: i) generating, real-time, at least one smart chart for the at least one alert strategy, wherein the at least one smart chart is an output chart that is associated with the at least one alert strategy and is based, at least in part, on the at least one technical indictor component which is used in the at least one alert strategy; receiving, by a computer system, a selection of at least one trading instrument for which the at least one alert strategy to be executed; executing, by a computer system, the at least one alert strategy for the at least one trading instrument, wherein the execution of the at least one alert strategy is based, at least in part, on one of: i) historical market data for the at least one trading instrument and/or ii) real-time market data for the at least one trading instrument from a pluralities of trading venues, wherein the execution of the at least one alert strategy automatically reflected in the at least one generated smart chart; and generating, by a computer system, at least one buy/sell alert when the execution of the alert strategy meets at least one condition pre-determined by the at least one alert strategy.

In some embodiments, the method can further include a step of submitting, by a computer system, a trade based on the at least one buy/sell alert.

In some embodiments, the at least one alert strategy further includes at least one technical indicator composite component, wherein the at least one technical indicator composite component comprising a plurality of technical indicators.

In some embodiments, the plurality of provided pre-programmed components further comprising at least one formation component, wherein the at least one formation component defines a conditional relationship between a plurality of technical indicator components, and wherein the at least one formation component is capable of receiving a plurality of inputs from a plurality of pre-programmed components and providing a plurality of outputs.

In some embodiments, the at least one alert strategy is a result of an visual arrangement of the plurality of provided pre-programmed components, further comprising at least one formation component.

In some embodiments, the at least one buy/sell alert is displayed on top of the corresponding price bar in the at least one generated smart chart.

In some embodiments, the at least one generated smart chart further includes at least one embedded chart for the at least one technical indicator used in the at least one alert strategy.

In some embodiments, the at least one generated smart chart further includes at least one technical analysis study generated for the at least one alert strategy.

In some embodiments, the method can further include a step of dynamically modifying the at least one generated chart when receiving at least one change to the at least one generated smart chart, wherein the at least one change represents adding at least one technical indicator which is not used in the at least one alert strategy.

In some embodiments, the alert component is capable of receiving a plurality of inputs from a plurality of technical indicator components.

In some embodiments, the instant invention includes a computer system that includes: i) memory having at least one region for storing computer executable program code; and ii) a processor for executing the program code stored in the memory, wherein the program code that includes: software code to provide a plurality of pre-programmed components, wherein the plurality of pre-programmed components comprising at least one pre-programmed software component from each of the following types of pre-programmed components: 1) a time series component, 2) a technical indicator component, and 3) an alert component, wherein each alert component represents either buy or sell opportunity; software code to receive at least one alert strategy, wherein the at least one alert strategy represents a strategy diagram made on a computer screen from the plurality of provided pre-programmed components, having at least: 1) at least one time series component, 2) at least one technical indicator component, and 3) at least one alert component; software code to validate the at least one alert strategy, wherein the validation comprising 1) software code to generate, real-time, at least one smart chart for the at least one alert strategy, wherein the at least one smart chart is an output chart that is associated with the at least one alert strategy and is based, at least in part, on the at least one technical indictor component which is used in the at least one alert strategy; software code to receive a selection of at least one trading instrument for which the at least one alert strategy to be executed; software code to execute the at least one alert strategy for the at least one trading instrument, wherein the execution of the at least one alert strategy is based, at least in part, on one of: i) historical market data for the at least one trading instrument and/or ii) real-time market data for the at least one trading instrument from a pluralities of trading venues, wherein the execution of the at least one alert strategy automatically reflected in the at least one generated smart chart; and software code to generate at least one buy/sell alert when the execution of the alert strategy meets at least one condition pre-determined by the at least one alert strategy.

BRIEF DESCRIPTION OF THE DRAWINGS

FIG. 3 illustrates yet another embodiment of the present invention.
FIG. 9 illustrates yet another embodiment of the present invention.
FIG. 11 illustrates yet another embodiment of the present invention.
FIG. 14 illustrates yet another embodiment of the present invention.
FIG. 16 illustrates yet another embodiment of the present invention.

Figure 1:
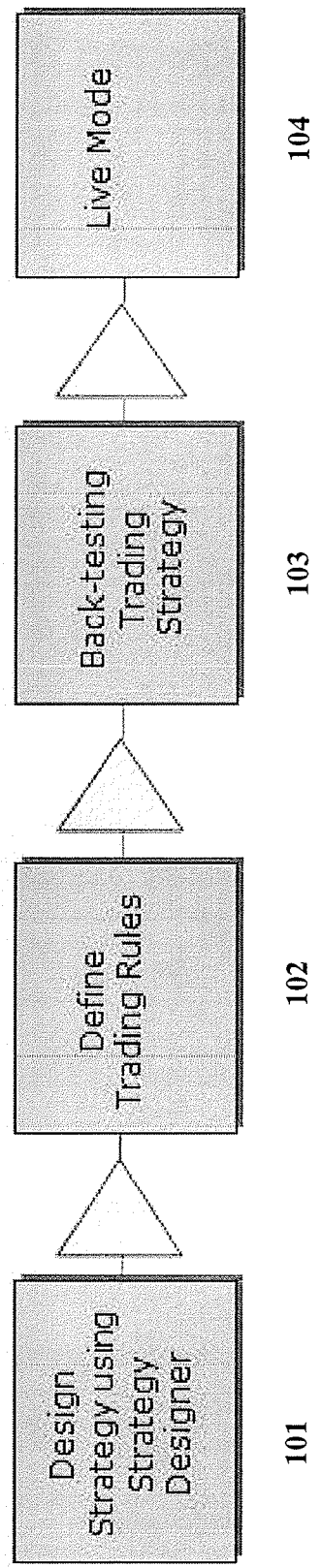
FIG. 1 illustrates an embodiment of the present invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

In some embodiments, the instant invention provides a predicative, decision support software which enables traders to develop complex trading strategies, back-test them and apply it to live market environment via simply drag-n-drop methods on intuitive graphical user interface.

In some embodiments, the instant invention can provide functionalities of:
Strategy Design,
Trading Rule Definitions,
Back-testing, and
Live mode.

In some embodiments, the instant invention can use Microsoft .Net framework and C+ programming language to build pre-programmed components that users can use to visually design trading strategies.

In some embodiments, the instant invention can utilize historical and live market data feed. In some embodiments, the instant invention can store data about securities and then use the stored securities data to identify. In some embodiments, the instant invention can accommodate real-time pricing feeds.

In some embodiments, the instant invention allows to connect to data providers to receive market data feeds (e.g., commonly used data providers are Bridge, eSignal, Bloomberg, etc.). In some embodiments, the instant invention can generally run on a client machine, which can be on the same local area network as a server runs an instance of the instance invention and communicates with sources of data.

In some embodiments, the instant invention may rely one or more of the following hardware and software capabilities of a user:
Microsoft.net 3.5,
Market data feed,
SQLite (a free embeddable SQL database engine; information about SQLite is available at http://www.sqlite.org, and is incorporated herein by reference),
Network Connection to the company server (for enterprise installations),
Broadband or faster Internet connection (for individual installations), and
software embodying an embodiment of the instant invention.

In some embodiments, the instant invention provides technical indicators which can be used in building trader's strategy and which can be organized in an analytic software library (e.g., a Technical Indicator Library).

TERMS AND ACRONYMS DESCRIPTION USED IN DESCRIBING SOME EMBODIMENTS OF THE INSTANT INVENTION

GUI: Graphical User Interface
Technical Analysis: A way to evaluate securities based solely on past prices and volume. Rather than assess the intrinsic value of a security, technical analysis looks at past price patterns to suggest future activity. In some embodiments, the instant invention allows user to use technical analysis to build strategies.

Strategy: A way to manage a portfolio based on a set of conditions that the user believes leads to profitable purchase or sale of securities. In some embodiments, the strategy can include an Alert Strategy and/or Trading Strategy.

Alert Strategy: A design that at least combines time series data, technical indicator(s), filter(s), and buy/sell alert(s) for the purpose to generate buy/sell signal(s).

Trading Strategy: A trading scheme that can determine buy/sell decision(s) based on buy/sell signal(s) generated by an alert strategy, exit rule(s) and/or allocation rule(s).

Alert: A condition that occurs when the instant invention identifies an opportunistic trade based on the alert strategy entered in the system and the current security prices brought into the system. An alert may be a buy alert or a sell alert.

Signal: Synonymous to the alert.

Strategy Designer: A software of the instant invention that enables user to create trading strategies via intuitive drag-n-drop on a GUI, validate, compile, and test alert strategies.

Strategy Component or Component: Building blocks of an alert strategy, including, but not limiting to, software objects like time series, technical indicators, formation functions, and alert panels. Each strategy component can be dragged-n-dropped onto a "canvas" to become part of a strategy diagram.

Canvas/Strategy Editor: A strategy design workspace that allows strategy components to be dropped in and linked together.

Analytic Panel: A visual representation of a strategy component. In some embodiments, the analytic panel is a GUI user control which can list all parameters of this indicator. In some embodiments, analytic panels can be linked with each other on a strategy diagram via drag-n-drop (i.e., linking)

Linking: A drag-n-drop action that connects two analytic panels so that the target panel object reads the source panel output or the source panel simply passes through information to the target analytic panel.

Coupler: A link that joins one analytic panel to another.

Strategy Diagram: A visually presented of an alert strategy on canvas in the Strategy Editor.

Visual Strategy: Synonymous to a strategy diagram and can refer to a strategy that a strategy diagram represents.

Allocation Rule: An amount or percent of capital to be allocated to each trade.

Exit Rule: A rule that details criteria that control when to exit a position. A typical exit rule can include trailing stops, P/L stop, etc. It can be also combined with trade alerts to form a trading strategy.

Trading Rule: A rule that can combine alerts, allocation rule and/or exit rule, and specify which one to use for each trading action in order to generate trading signals.

Strategy Document: A persistent file that represents a particular alert strategy. A strategy document can be saved and loaded from user's file system.

Filtering: A process of identifying candidates from a universe of entities that meet a user-defined criterion or a set of criteria.

Trend Lens: A tabular output of trading alert(s) (i.e., buy/sell signal(s)/alert(s)).

Smart Chart: An output chart that is associated with an alert strategy. It shows relevant historical price charts with buy/signals, and the technical indicators used.

P & L: Profit and Loss

PnL: Synonymous to P & L.

MACD: A Moving Average Convergence/Divergence (MACD) technical indicator which is used as an example for purposes of this exemplary disclosure. MACD usually compares the difference of the 12 day and 26 days Exponential Moving Averages (EMA) with its own 9 day moving average. The resulting histogram can be then used to generate buy/sell alert(s)/signal(s).

Fundamental Analysis: A way to evaluate securities based on their financial performance or intrinsic value.

Illustrative Examples of Some Embodiments of the Instant Invention

In some embodiments, the instant invention can allow to:
build trading strategies, no matter how simple or complex, without having to worry about software programming;
accommodate multiple asset types, including but not limiting to, equities, currencies, and commodities;
generate trade alert(s) based on strategies that are custom designed graphically;
back-test trading strategies because it is linked to trade alert(s) in addition to customizable allocation, profit taking, and/or risk management rule(s);
show back-test result(s) in tabular form which can be exported to analytical software (e.g., MS Excel), and/or as painted markers on a historical chart;
provide practically unlimited number of building blocks/components that can be dragged-n-dropped on the designer canvas and linked up graphically;
maintain complex trading strategies, which can be done on the same intuitive graphical interface;
forward (live) testing by displaying live results on real time basis in both graphical and tabular forms;
support short traders who trade on the basis of technical indicators and short term security price movements;
support portfolio managers whose investment style tends to open and close positions rapidly; and
support commodity and/or currency traders seeking to take advantage of rapid price changes.

In some embodiments, as FIG. 1, illustrates, the first step 101 is to design an alert strategy, which is to design a routine that generates buy/sell signals (i.e., alert), followed by defining exit and trading rules 102 and back-testing 103. In some embodiments, these steps are repeated until satisfactory results are obtained. In some embodiments, the resulting strategy is then turned on in a live mode 104 and real-time alerts are generated for users/traders to take action.

In some embodiments, each step can be visually divided on the designer's screen using page tabs.

Figure 2:
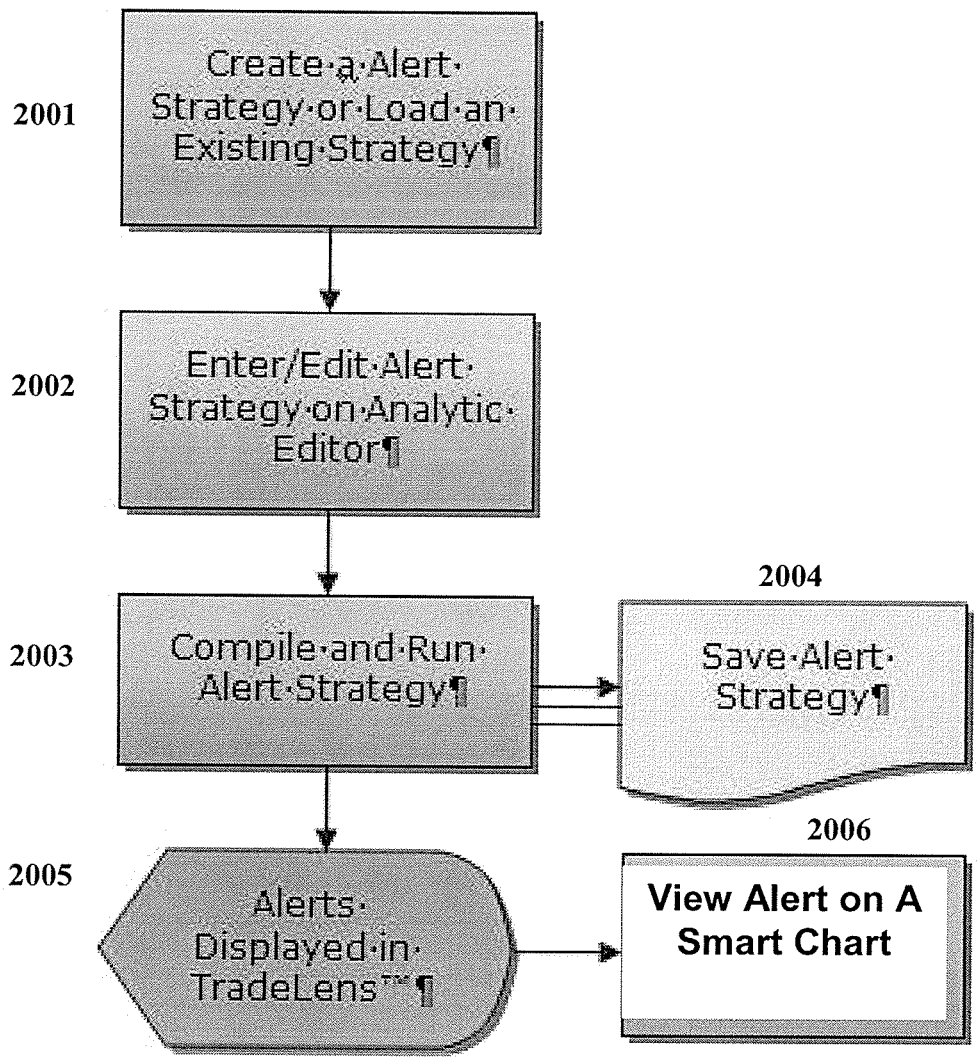
FIG. 2 illustrates another embodiment of the present invention.

FIG. 2 illustrates a exemplary workflow that user would take to designing an alert strategy in accordance with some embodiments of the instant invention. In first step 2001, a user creates an alert strategy or loads existing strategy. Next, step 2002, the user enters/edits strategy using an analytic editor. In step 2003, user compiles and runs the alert strategy. In step 2004, users saves the alert strategy. In steps 2005 and 2006, alerts are generated as predetermined conditions of the alert strategy are met using historical and/or live data and alerts are shown on a smart chart.

In some embodiments, the instant invention involves 4 main functionalities:
1. Alert Strategy design via a Strategy Designer tool (on an interactive canvas);
2. Define Trading Rules;
3. Back-testing; and
4. Live Mode alerts.

Exemplary Embodiments of Strategy Designer Tool

In some embodiments, the Strategy Designer tool can allow users/traders to:
design algorithms;
create alert strategies via intuitive drag-n-drop on a GUI;
validate, compile, and test alert strategies; and
analyze outputs of alert strategies.

Figure 3:
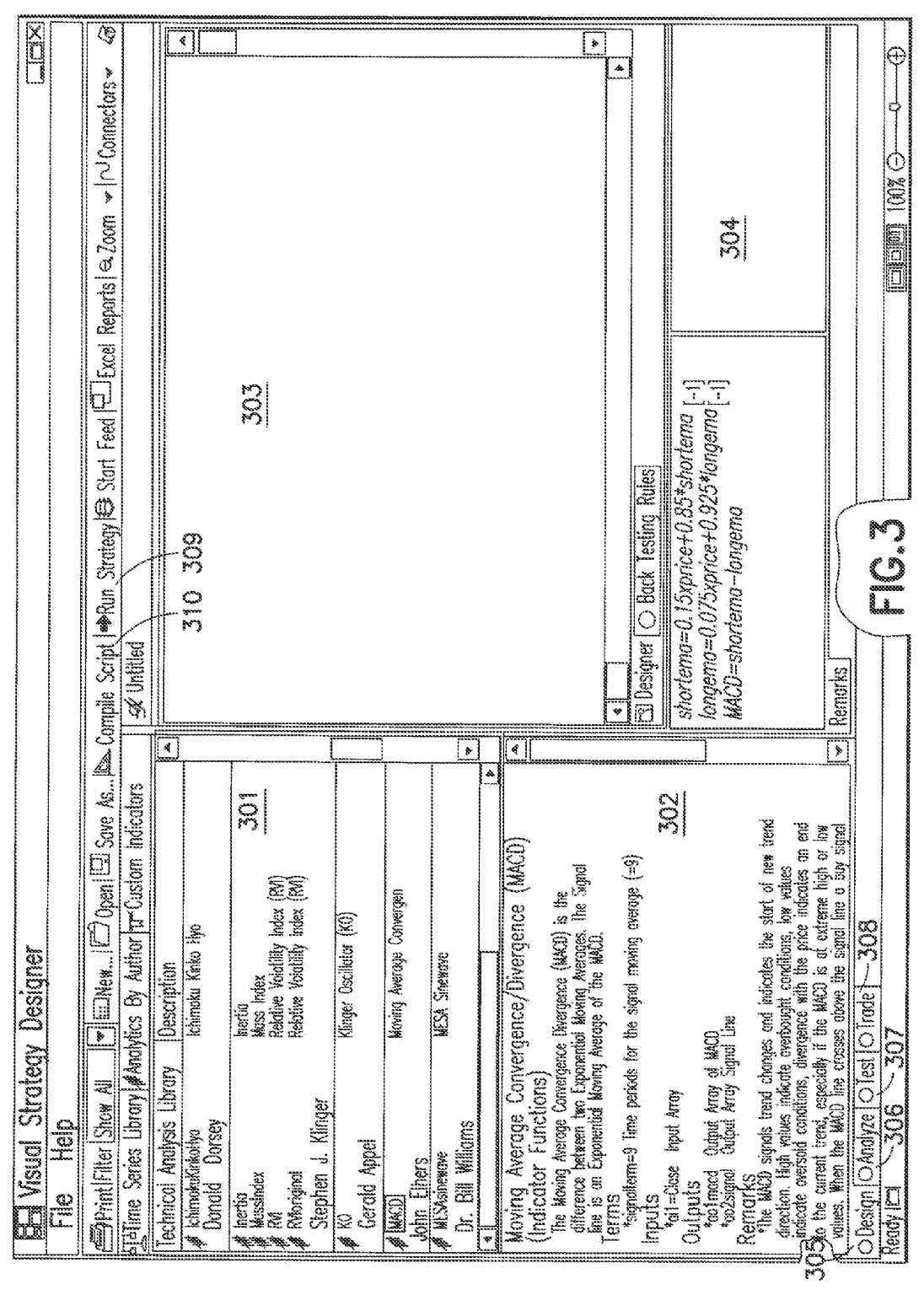

As FIG. 3 illustrates, in some embodiments, the Strategy Designer tool can have its main window divided in four sub-windows:

Strategy Component Library 301,
Strategy Component Description 302,
Strategy Diagram Evaluation Log and Strategy Editor 303, and
Strategy Component Formula Reference 304.

In some embodiments, the primary workspace of the Strategy Designer tool is the

Strategy Editor in which strategy diagrams are created. In some embodiments, the Strategy Editor is analogous to a canvas where the strategy design's diagram is drawn on. The terms "Strategy Editor" and "Canvas" are used interchangeably for purposes of this disclosure.

In some embodiments, a graphically-created strategy using Strategy Designer is called a strategy diagram. In some embodiments, a strategy diagram can be saved to the user's file system as a strategy document with, for example, an extension of ".sdb." In some embodiments, a strategy diagram is run or is executed directly within Strategy Designer tool and results are made available in the tabular format of Trend Lens and/or in smart charts window panes.

In some embodiments, a strategy diagram needs be compiled before it can be run. In some embodiments, during compiling, the strategy diagram is first validated to ensure that there are no user design errors, and that the strategy diagram's logic technically makes sense. In some embodiments, the strategy diagram can be automatically compiled when a user requests to run it. In some embodiments, the user may choose to manually compile it for validation purposes.

In some embodiments, a previously-saved strategy document can be opened and loaded into the Strategy Editor for recurring run operations of that alert strategy. In some embodiments, a strategy diagram graphically conveys the strategy's logic by containing iconic strategy construction elements called strategy components, which are GUI controls that can be customized by users.

In some embodiments, strategy components are connected in a particular way to each other with graphical lines called couplers. In some embodiments, couplers show the flow, direction, and/or logic of market data and analytics. in some embodiments, a coupler can be used to connect two strategy components together by their various special I/O (input/output) points called connectors. In some embodiments, one strategy component's output connector is "coupled" to another strategy component's input connector, denoting a flow and/or a relationship of information from the source strategy component through its particular output series into the target strategy component's input series. In some embodiments, the collection of all available strategy components can be located in a software library.

In some embodiments, a strategy diagram is created by selecting strategy components from a library by dragging and dropping components onto the canvas, setting their properties and linking them together. In some embodiments, linking two strategy components can be done by dragging one or more couplers between the connectors of each other.

The "Design" Tab 303

In some embodiments, the Strategy Designer tool can have four tabs at the lower left corner 305-308 which guide the user to follow the workflow (see FIG. 1) to create a strategy graphically. For instance, in FIG. 3, the "Design" tab 305 is the active one—i.e., the user can click the "Design" tab to start creating/edits a strategy diagram.

Strategy Components (or Components)

In some embodiments, strategy components are the building blocks of an alert strategy. In some embodiments, there are numerous categories of components (i.e., one, two. three, etc.). In some embodiments, there are seven categories of components:

time series;

indicator functions;

formation functions;

alert series;

comparative functions; and advance/decline functions.

Analytic Panel: Visual Representation of a Strategy Component

Figure 4:
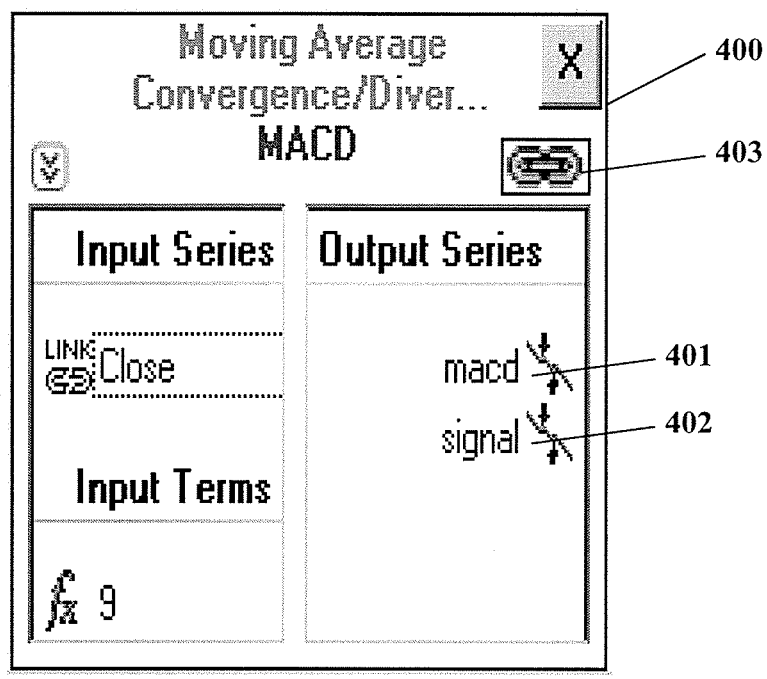
FIG. 4 illustrates yet another embodiment of the present invention.

In some embodiments, when a strategy component is dragged-n-dropped onto the canvas, it becomes an object that is part of the strategy diagram. In some embodiments, an analytic panel is the visual representation of the underlying strategy component. In some embodiments, the analytic panel shows all the attributes of its strategy component, including name, description, and most important, its input-output parameters that can be connected to other components on the diagram. FIG. 4 illustrates an embodiment of the exemplary analytic panel for a MACD indicator. Table 1 lists an exemplary persistent structure for MACD technical indicator.

TABLE 1

| | |
|---|---|
| Class | Indicator Functions |
| Decl | long WINAPI MACD(Array *ai1, Array *ao1macd, Array *ao2signal, long signalterm, long start); |
| Type | Array Function |
| Source | calc.h |
| Index | 43 |
| Panel | −1 |
| Name | Moving Average Convergence/Divergence (MACD) |
| Author | Gerald Appel |
| note1 | The Moving Average Convergence Divergence (MACD) is the difference between two Exponential Moving Averages. The Signal line is an Exponential Moving Average of the MACD. |
| note2 | The MACD signals trend changes and indicates the start of new trend direction. High values indicate overbought conditions, low values indicate oversold conditions. Divergence with the price indicates an end to the current trend, especially if the MACD is at extreme high or low values. When the MACD line crosses above the signal line a buy signal is generated. When the MACD crosses below the signal line a sell signal is generated. To confirm the signal, the MACD should be above zero for a buy, and below zero for a sell. |
| note3 | The time periods for the MACD are often given as 26 and 12. However the function actually uses exponential constants of 0.075 and 0.15, which are closer to 25.6667 and 12.3333 periods. To create a similar indicator with time periods other than those built into the MACD, use the Price Oscillator function. |
| note4 | The MACD was developed by Gerald Appel. |
| Notes | 4 |
| input1 | Variable: Array ai1 Description: Input Array Time Series: Close |
| Inputs | 1 |
| output1 | Variable: Array ao1macd Description: Output Array of MACD |
| output2 | Variable: Array ao2signal Description: Output Array Signal Line |
| Outputs | 2 |
| term1 | Variable: Long signalterm Description: Time periods for the signal moving average Default Value: 9 |

TABLE 1-continued

| Terms | 1 |
|---|---|
| plot1 | Series to plot: output1 Output Array of MACD |
| | Scale: Auto |
| | Linestyle: Solid Line |
| | color1: Auto |
| | color2: Auto |
| | charttype: Line |
| | width: 1 |
| | legend: 7 |
| | display: MACD |
| plot2 | Series to plot: output2 |
| | scale: Auto |
| | linestyle: Solid Line |
| | color1: Auto |
| | color2: Auto |
| | charttype: Line |
| | width: 1 |
| | legend: 7 |
| | display: MACD |
| Plots | 2 |

In some embodiments, the MACD indicator's analytic panel (FIG. 4) and Table 1 show that the MACD technical indicator can, for example, expects two inputs: one is a link called "Close", which means it expects "Close" price series from another strategy component (a time series that can provide "Close" price input series). The second input parameter is called "Input Terms," which is user editable with a default/current value of 9. In some embodiments, FIG. 4 shows the output parameters of MACD to be the left part of the panel: macd (401) and signal (402), which can be linked to another downstream strategy component, respectively. In some embodiments, the analytic panel (400) can have a "chain" link output (403), which is simply a pass-through connector such as any data passed to this MACD panel (400) can be passed on directly to another strategy component intact. In some embodiments, having the pass-through connector 403 can facilitate the organization of a strategy diagram and helps to show some possible logical relationship among strategy components.

Strategy Component: In and Out

In some embodiments, each strategy component structure can be persistent so that an object can be instantiated by reading in its structure. For example, if a MACD indicator (400) has one input and 2 outputs, its persistent structure can be similar to the one in Table 1.

Strategy Component Library

In some embodiments, available strategy components in a strategy component library can be presented in a multi-tab list view (FIG. 3). In some embodiments, the tabs can be time series, analytics by author, and/or custom indicators (FIG. 3). In some embodiments, within each tab, there is a list 301 of available strategy components along with a brief description 302. In some embodiments, upon clicking on a strategy component, the usage description 302 can be displayed which details a description, a list of input and output parameters, and/or its mathematical functions if available.

Time Series Library

In some embodiments, Time Series tab can list available time intervals for which time series data is available. In some embodiments, these time series are strategy components that can be dragged-n-dropped onto the canvas. In some embodiments, the entries can be sorted from smallest time interval to the longest time interval (e.g., 5 minutes, 15 minutes, 30 minutes, 1 hour, quarterly, and yearly). In some embodiments, the time intervals can be further grouped by Intra-day Bar Series for interval shorter than daily and/or by Historical Interval Bar Series for time intervals starting form daily to yearly, and so on.

Analytics by Author

In some embodiments, the "Analytics By Author" tab can list indicators grouped by authors who created these indicators, allowing for adding $3^{rd}$ party indicators (e.g., indicator developed by Real Time Trading Technologies, J. Wells Wilder, Richard W. Arms, John Bollinger, Gerald Appel, etc.).

Custom Indicators

Figure 6A:
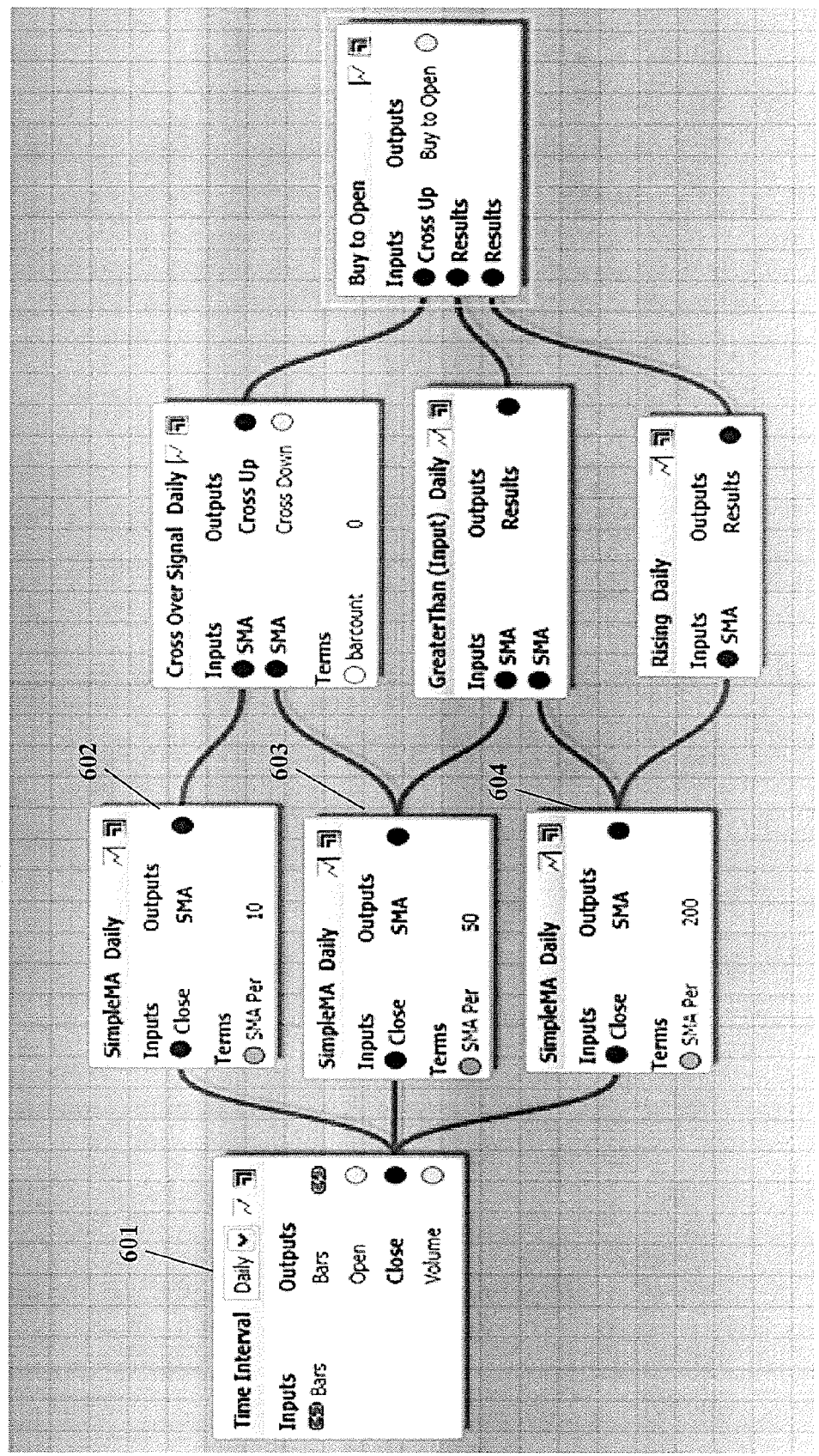
FIGS. 6A-6C illustrate some embodiments of the present invention.
Figure 6B:
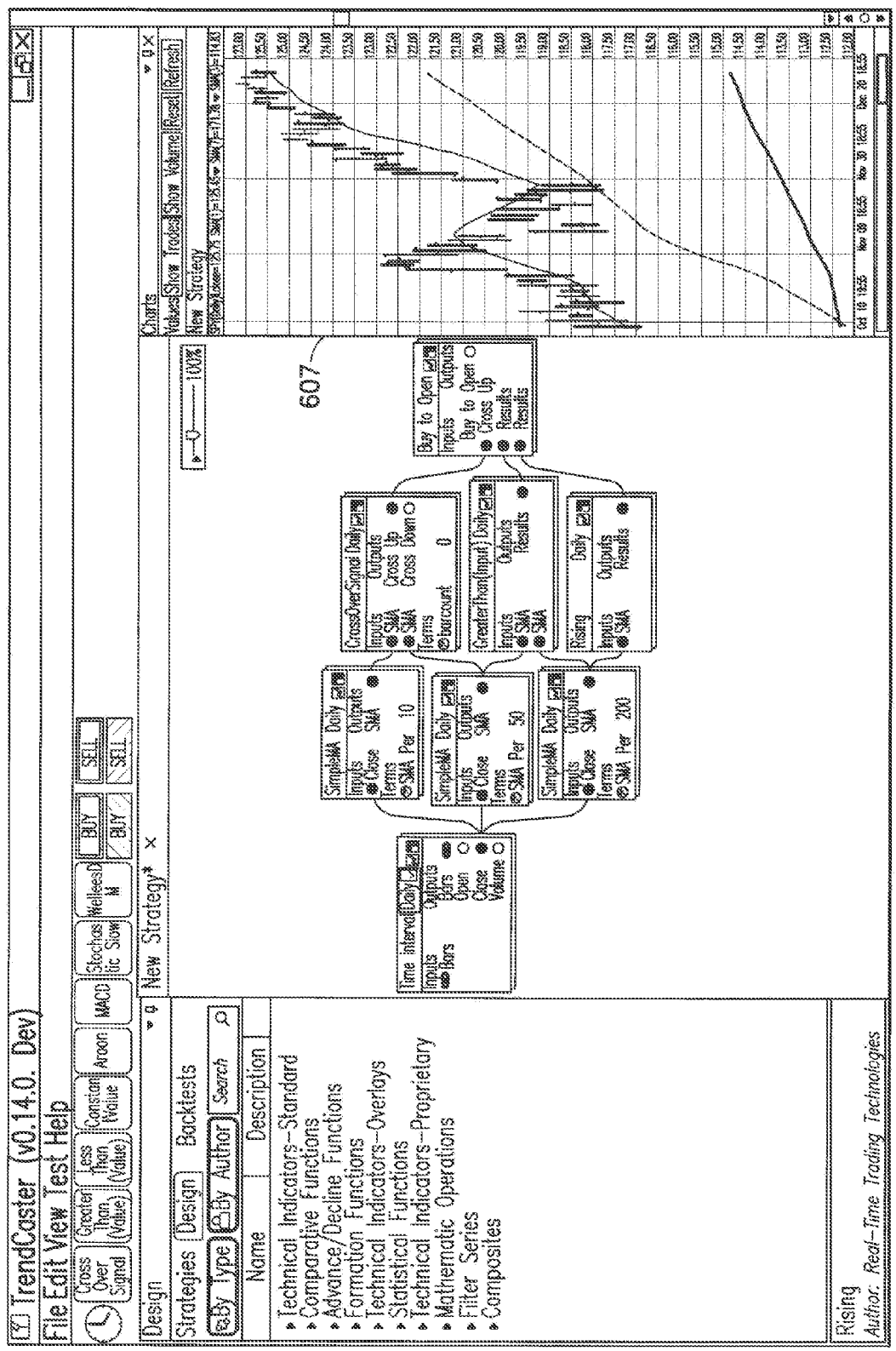
Figure 6C:
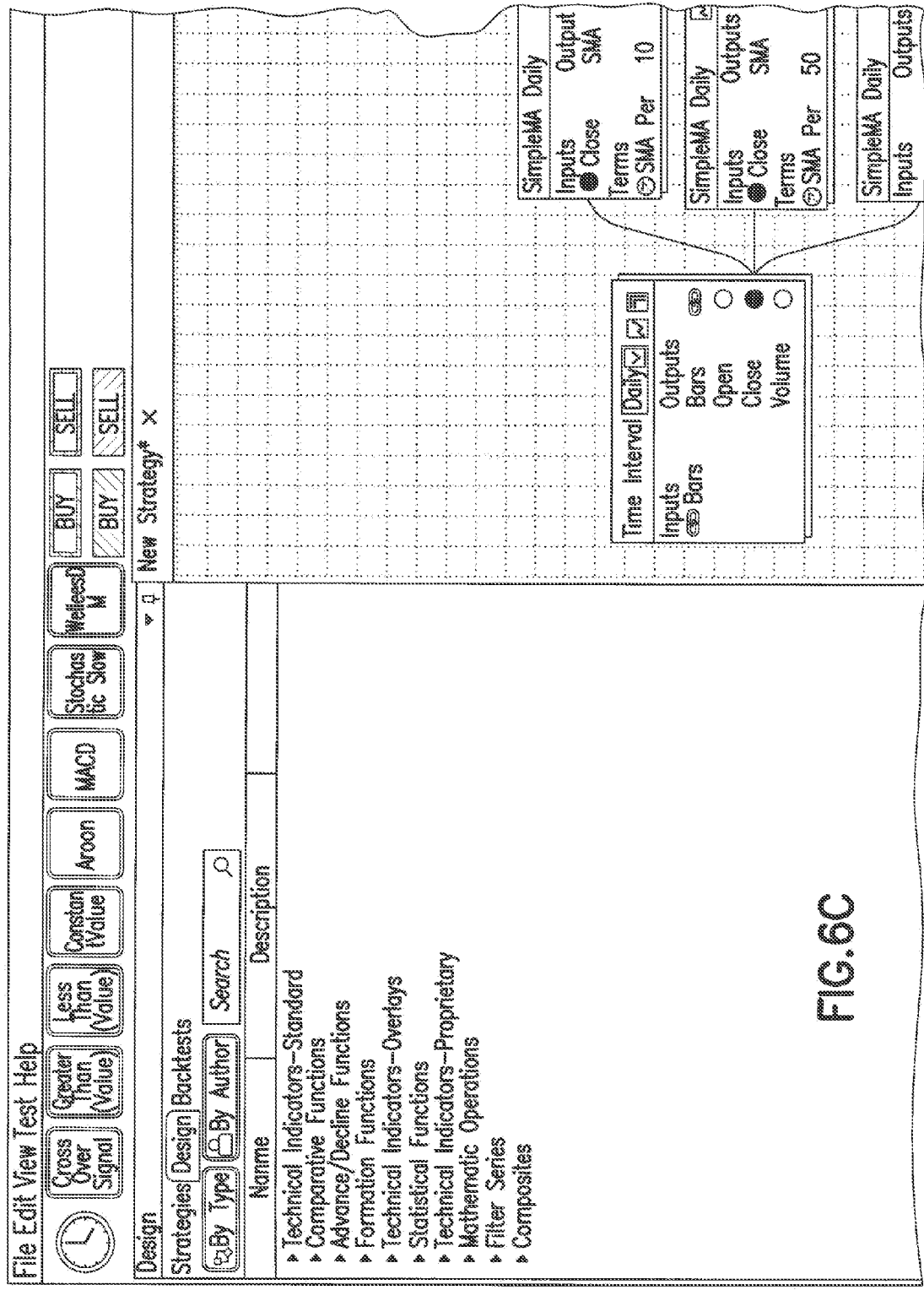

In some embodiments, as shown in FIG. 6C, default strategy components can be listed under "Custom Indicators" tab. In some embodiments, as shown in FIG. 6C, included components can be Buy or Sell alert signals, filter series, formation functions, indicator functions, comparative functions, advance/decline functions, and/or filter bridge series.

Canvas—the Strategy/Analytic Editor

In some embodiments, as FIG. 3 shows, canvas 303 is the workspace where users can add strategy components (drag-n-drop) to and work on connecting the components to create a visual strategy diagram. In some embodiments, users can freely move strategy component to any location on the canvas without affecting the links.

Zoom Control

In some embodiments, the strategy diagram can have a zoom-in and zoom-out capability with all aspect ratios preserved. In some embodiments, the Strategy Designer can have a dropdown tool button as part of its tool bar. In some embodiments, a user can select a zoom ratio to have the current strategy diagram zoom-in or zoom-out.

Drag-n-Drop a Strategy Component

In some embodiments, when a strategy component can be dragged onto the canvas 303, an instance of the visual representation class (i.e., the analytic panel, FIG. 4) is created. In some embodiments, this instance is referred as AP object whose creation can be triggered by a drag-n-drop event. In some embodiments, the AP object can visually show all properties of the technical indicator and all its connectors.

Some Examples of Creating a Strategy Diagram

In some embodiments, an alert strategy can typically have numerous categories (i.e., one/two/three . . . ). In one example, the alert strategy can include four categories of components: time series, indicators, filters and formation, and alerts. In some embodiments, filters and formations can be optional for some strategies which do not have them. In some embodiments, a typical strategy would generally have at least one component in each of the other three categories.

Figure 5:
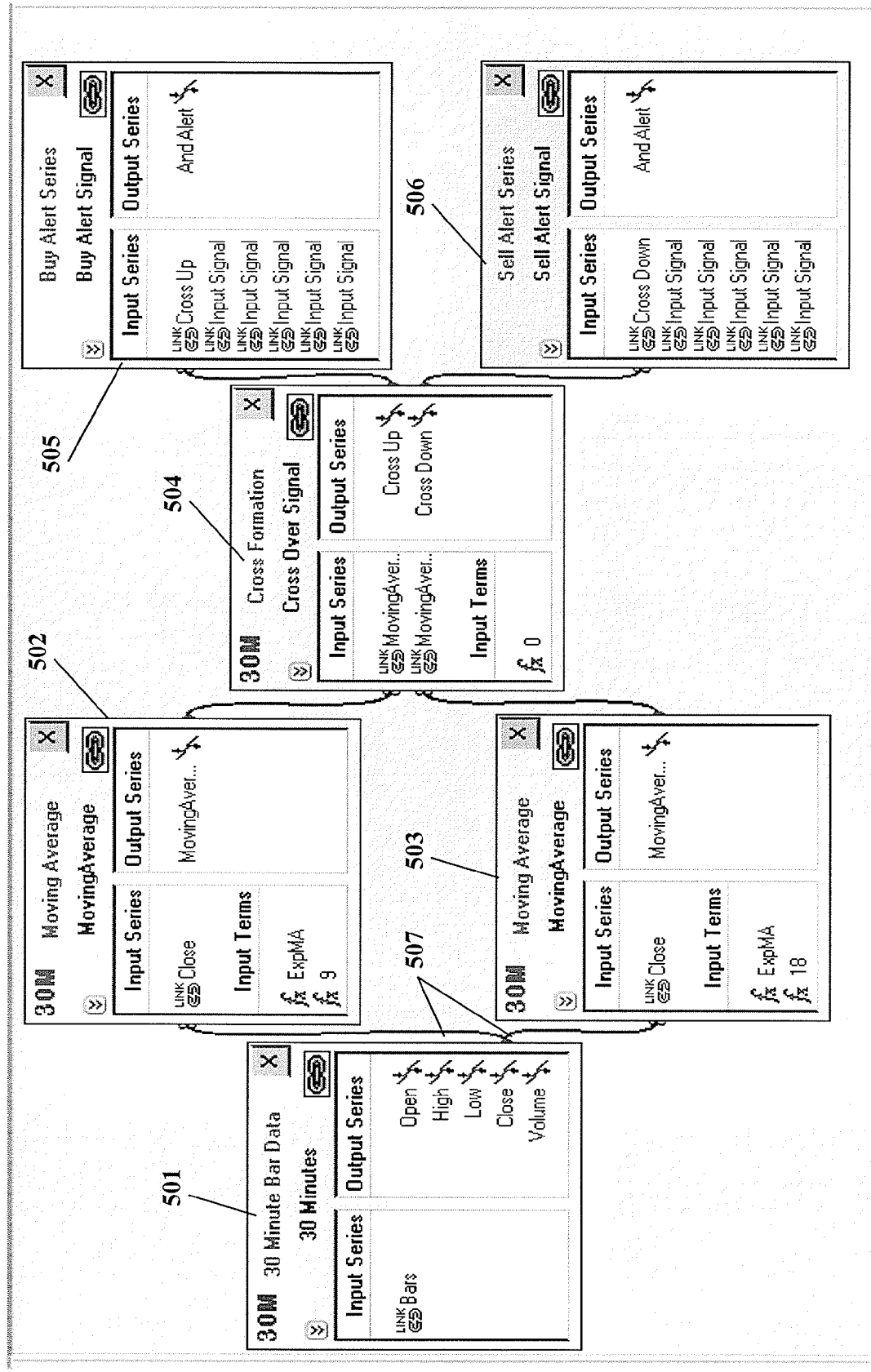
FIG. 5 illustrates yet another embodiment of the present invention.

In some embodiments of the instant invention, the design of strategy diagram can follow the below example of creating a simple alert strategy using moving averages which is shown in FIG. 5. In some embodiments, the provided below step 5 can be done while steps 2 to 4 are being done—e.g., as users can start linking components on a canvas while more components are to be added.

Step 1: Adding a Time Series.

As shown in FIG. 5, a user drags-n-drops a 30 minute bar series 501 from category of intra-day (minute interval) bar series.

Step 2: Adding a Technical Indicator.

As shown in FIG. 5, a user drag-n-drops 2 moving average indicators 502, 503 from the custom indicator list. In some embodiments, the moving average indicator panel 502, 503 on canvas has two input terms that can be edited by user. In this case, the user has changed the second parameter to 9 and 18 respectively, which in effect specifies that 9 bar and 18 bar moving averages are to be calculated.

Step 3: Adding a Formation Component.

As shown in FIG. 5, in some embodiments, each of the two moving averages can have one output which serves as inputs to a formation component (Cross Formation) 504. In some embodiments, the formation component 504 outputs a relationship when one moving average crosses the other. For example, there are two scenarios that the Cross Formation component 504 can output: Cross Up or Cross Down, as indicated under the output series of the cross formation panel 504.

Step 4: Adding an Alert Component.

As shown in FIG. 5, in some embodiments, the user adds two alerts: a Buy alert 505 and a Sell alert 506. In some embodiments, each of alerts 505, 506 can take multiple inputs under their input series. As shown in FIG. 5, each of the alert components takes one input. In some embodiments, a buy alert is generated when there is cross up, and a sell alert is generated when there is cross down.

Step 5: Linking Added Components.

As shown in FIG. 5, in some embodiments, this step can be performed while going through steps 1 through 4. As shown in FIG. 5, the two moving averages 502 and 503 take the Close output from the 30 minute time series 501, so links 507 connect the time series panel 501 to each one's input of the two moving averages panels 502 and 503. Similarly, outputs of the two moving averages are fed into two inputs of the cross formation component 504. And, the cross formation's cross up output is linked to the buy alert 505, and the cross formation's cross down output is linked to the sell alert 506.

In some embodiments, alert strategy components (AP objects) can receive multiple inputs. In some embodiments, if a user wants four specific things to occur before he or she gets an alert, in accordance with some embodiments of the instant invention, only a single alert panel needs to use.

In some embodiments, strategy components (AP objects) objects can provide multiple outputs, and each strategy component (AP object) can be used multiple times. For example, user can build a strategy using 10-bar, 50-bar, and 200-bar simple moving averages (SMA). He or she may want a buy alert when the 10-bar SMA crosses up over the 50-bar SMA, and when the 50-bar SMA is greater than the 200-bar SMA, and when the 200-bar SMA is rising. As shown in FIG. 6A, in accordance with some embodiments of the instant invention, the user would need to bring out to the canvas only: one time interval panel (601) and three SMA panels (602-604).

As shown in FIG. 6B, in accordance with some embodiments of the instant invention, the Strategy Designer tool can create a smart chart 607 based on technical indicator component(s) that is (are) part of a strategy diagram. In some embodiments, as user builds the strategy diagram, the smart chart is real-time built and can include the technical indicator(s) that is (are) a part of user's alert strategy.

Figure 7A:
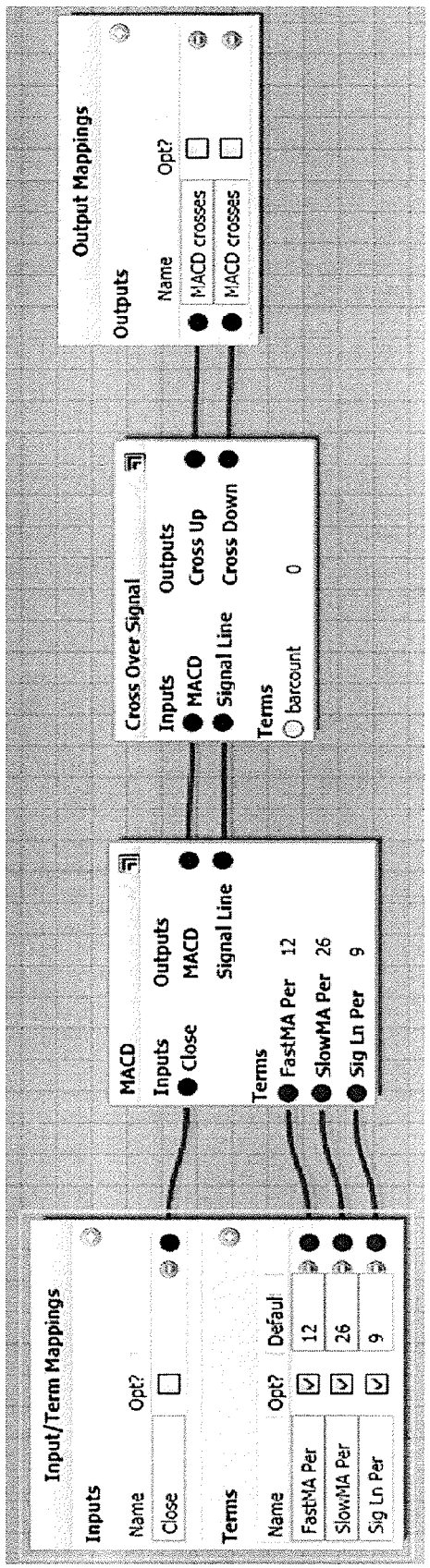
FIG. 7A-7B illustrate some other embodiments of the present invention.
Figure 7B:
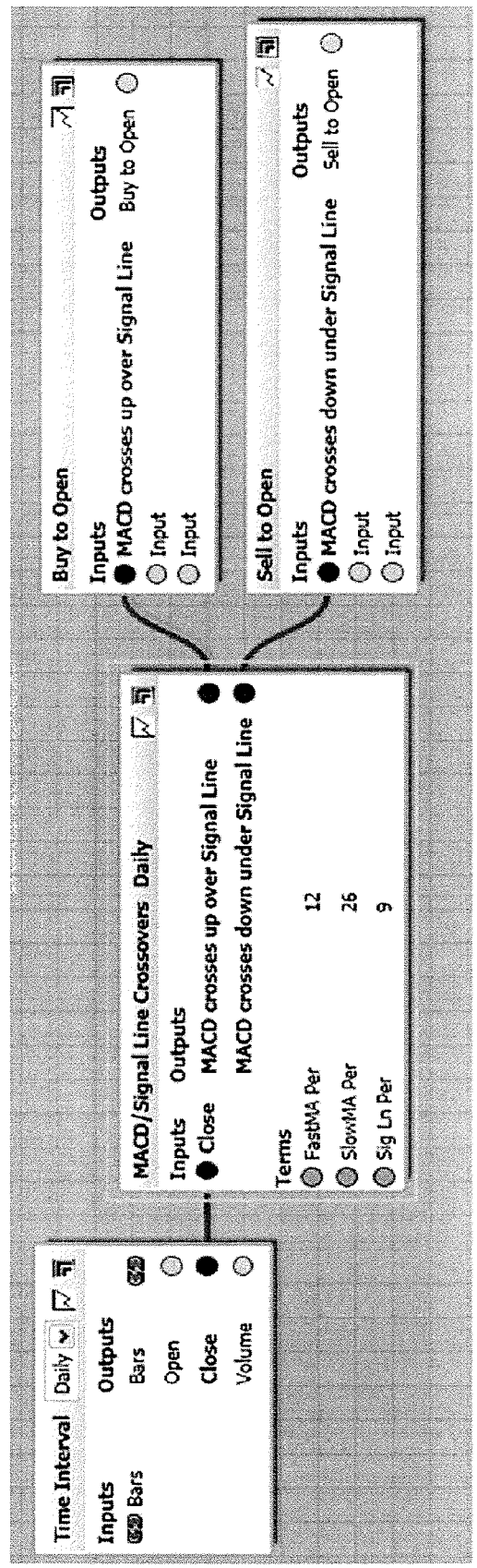

As shown in FIGS. 7A and B, in accordance with some embodiments, the instant invention allows a user to combine a group of technical indicators into a composite object that can be added to the user's library for future use. In some embodiments, the composite object and then re-used in cases when a trader uses a specific combination of indicators and actions frequently. As shown in FIGS. 7A and B, a simple MACD-Signal Line Crossover. In some embodiments, the invention allows the user to select inputs, and/or which variables to expose to the user. In some embodiments, user can choose to not expose any or all of the variables, and then variables would be unchangeable in a composite object. In some embodiments, the output mapping allows the user to create as many outputs as necessary for the composite object/component, and to customize names (and/or parameters) for those outputs. FIG. 7 shows the finished composite object that combines two objects into one.

Compile an Alert Strategy—Trading Algorithm

Figure 8:
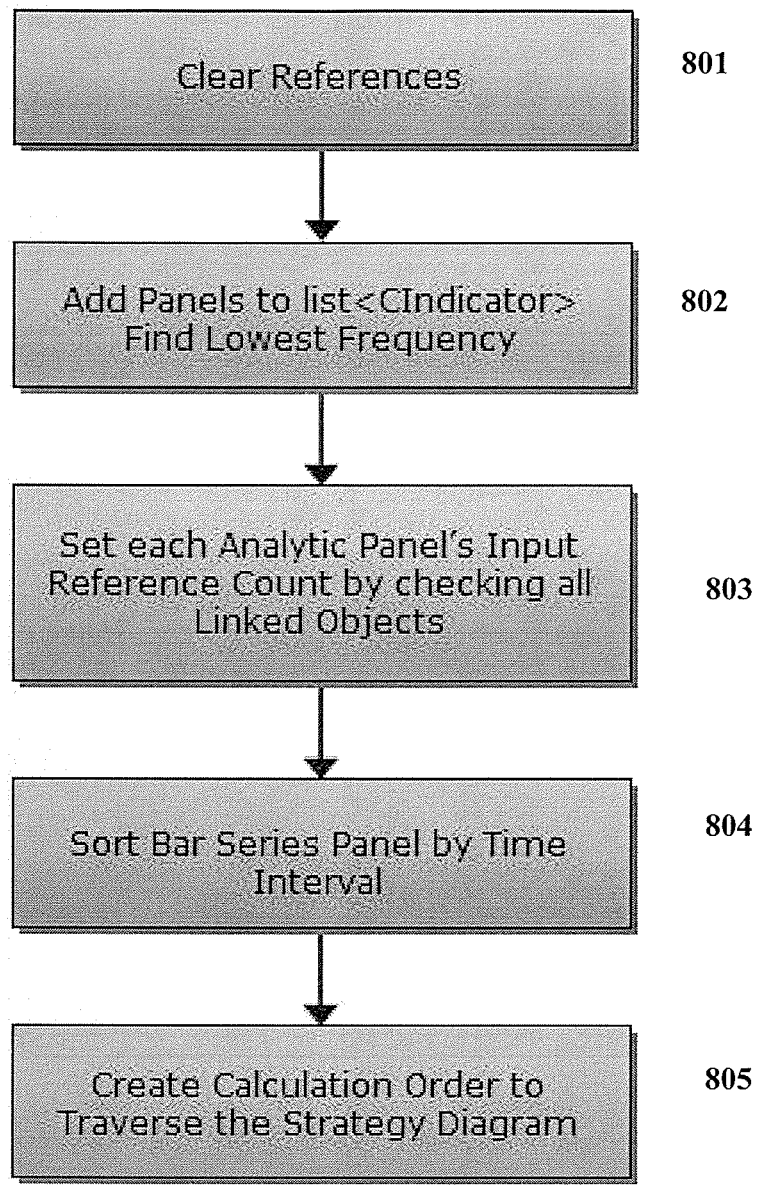
FIG. 8 illustrates yet another embodiment of the present invention.

In some embodiments, an alert strategy, upon its creation, is a visual diagram. In some embodiments, a user may want to compile the alert strategy first for validation. In some embodiments, the compiler can use the visual diagram as input and compiles it. In some embodiments, the compiler can check for static and/or logical errors, and inform the user if any error exists. In some embodiments, the output of compiling can be a populated dependency internal structure that is calculable when the strategy is run later on. As shown in FIG. 8, in accordance with some embodiments, the instant invention can follow an exemplary workflow of steps 801-805 to compile the strategy diagram into a calculable format.

Visual Strategy Evaluation Log: Proof-Reading a Strategy Diagram

In some embodiments, the visual strategy compiler performs evaluation of a strategy diagram and outputs a sequence of actions to an evaluation log. In some embodiments, as shown in FIG. 9, the evaluation log is available visually as a rolling log which details the details of compiler activities. In some embodiments, the log translates the strategy diagram evaluation sequence in a plain English for user's verification and debugging purpose.

Menu Items:

File

In some embodiments, under File menu, there are four options:

Open,
Save,
Save As, and
Exit.

In some embodiments, the "Open" option allows user to load an existing alert strategy (strategy document) from a file system into the Strategy Editor tool. In some embodiments, a user can be prompted to save current work before another strategy can be loaded into workspace. In some embodiments, choosing the "Save" option save the current strategy in the Strategy Editor. In some embodiments, choosing the "Save as" option would let a user to save the strategy with a user-designated file name.

Help

Menu Bars

In some embodiments, the Strategy Editor can provide the following choices for menu bars:

Print
StrategyComponent Display Filter
New: Clear Strategy Editor's canvas to have an empty workspace.
Open (See Menu Items: File, Open, etc.)
Save As (See Menu Items: File, Open, etc.)
Compile Script
Run Strategy
Start Feed
Excel Reports: Export an Excel format report and display it in Excel.
Zoom
Connectors: Let the user select shape of coupler to connect AP objects (strategy components on canvas).
Save and Load an Alert Strategy In some embodiments, user can be prompted to save a strategy diagram that is created or modified in order to prevent loss of design work. In some embodiments, the strategy diagram can be saved in a special format, for example, with extension ".sdb". In some embodiments, a user can load an existing strategy by loading the corresponding strategy file/ document (.sdb) from his or her file system. In some embodiments, the loaded alert strategy would be ready for editing, and/or run.

Run an Alert Strategy

Figure 10:
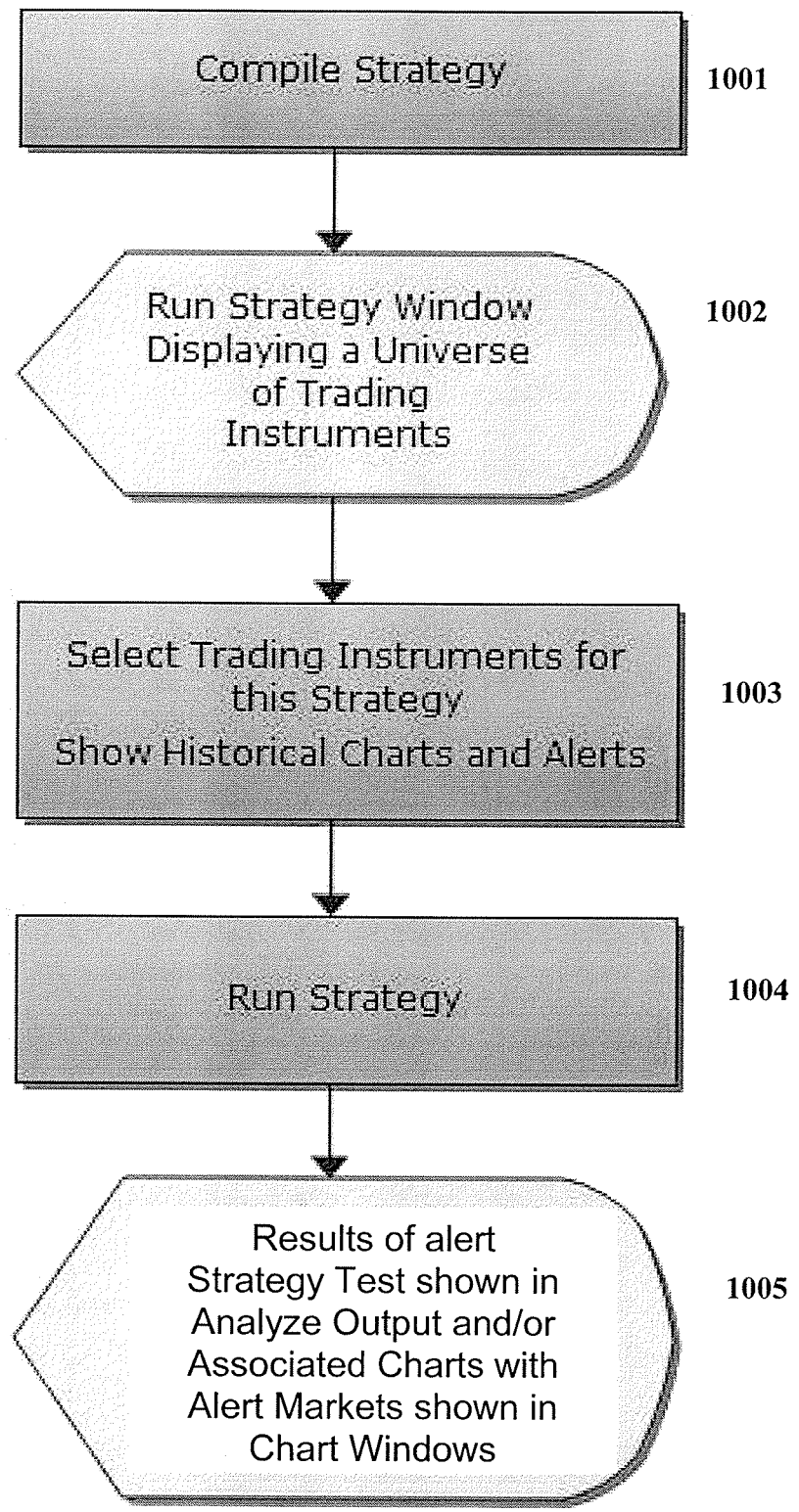
FIG. 10 illustrates yet another embodiment of the present invention.

In some embodiments, a user can run the current strategy diagram by clicking on the "Run strategy" button 309, as shown in FIG. 3. As shown in FIG. 10, in accordance with some embodiments, the instant invention can follow an exemplary execution workflow of steps 1001-1005 to execute user's alert strategy.

Trading Instrument Selection

In some embodiments, a user is given a list of available trading instruments to apply user's strategy. In some embodiments, instruments can be categorized, and are sortable and searchable. As shown in FIG. 11, in some embodiments, user's selection can be preserved with, for example, "check" marks shown against each chosen instrument. Consequently, user's alert strategy is executed on selected trading instruments, and user's alert strategy can then run in accordance with the exemplary flow shown in FIG. 10.

Run Strategy Window Menu Bars

File

In some embodiments, under File menu, there cab be four menu items:

Load Selection,
Save Selection,
Save Selection As, and
Exit.

In some embodiments, the "Load Selection" option allows user to load an existing list of trading instruments from a file system into a current session to do test on the alert strategy. In some embodiments, the "Save Selection" option allows user to save the current instrument selection (checked ones) into a file. In some embodiments, the "Save Selection As" option allows user to save current selected instrument list with a user-designated file name.

Help

Properties (Button)

Figure 12:
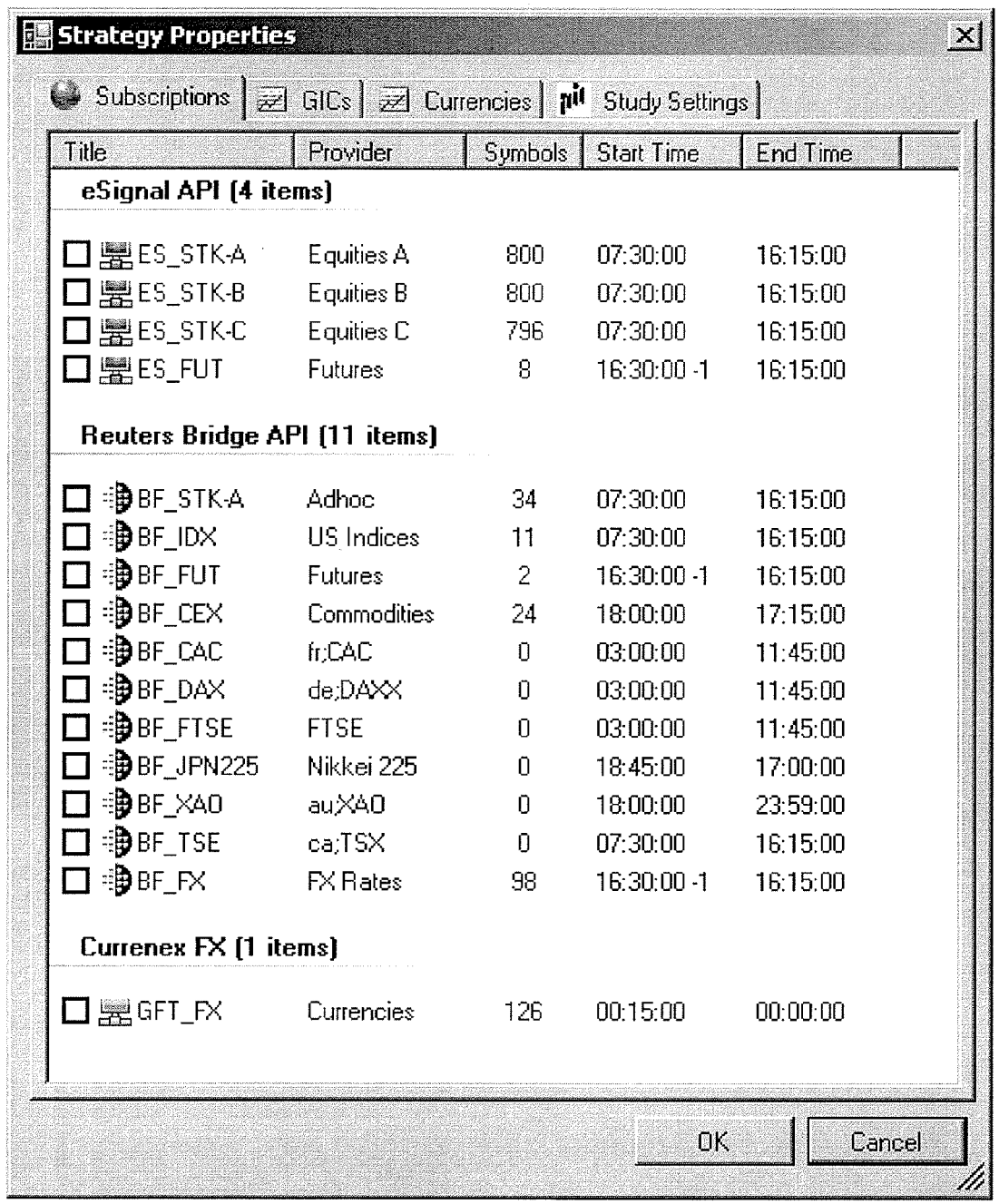
FIG. 12 illustrates yet another embodiment of the present invention.

As shown in FIG. 12, in some embodiments, a Properties window can allows a user to:

Edit Subscription,
Filter instrument by General Industry Code (GIC),
Select Currency, and/or
Do Study Setup to set default indicator parameters.

Business Rules

In some embodiments, strategy components can have their parameters to be pre-set to default values. In some embodiments, validation is done based on at least in part on user inputs. In some embodiments, connections of the components can be validated to ensure business and logical integrity.

Events Flow

In some embodiments, user can invoke "Compile" and/or "Run a Strategy" functionalities by clicking on corresponding command buttons 309 and 310, as shown in FIG. 3.

In some embodiments, each component utilizes its own GUI user-control and/or event-driven processing function(s).

The Analyze Tab: Analyze the Alert Strategy

In some embodiments, after competing a strategy diagram, a user can move onto the next phase of a strategy analysis by, for example, clicking on a tab 306 of the Strategy Designer tool, as shown in FIG. 3. In some embodiments, the user can compile and run the strategy that the user has just designed. In some embodiments, the output of alert strategy execution shows up on this "Analyze" tab 306.

Output of an Alert Strategy Run

Figures 13, 13A:
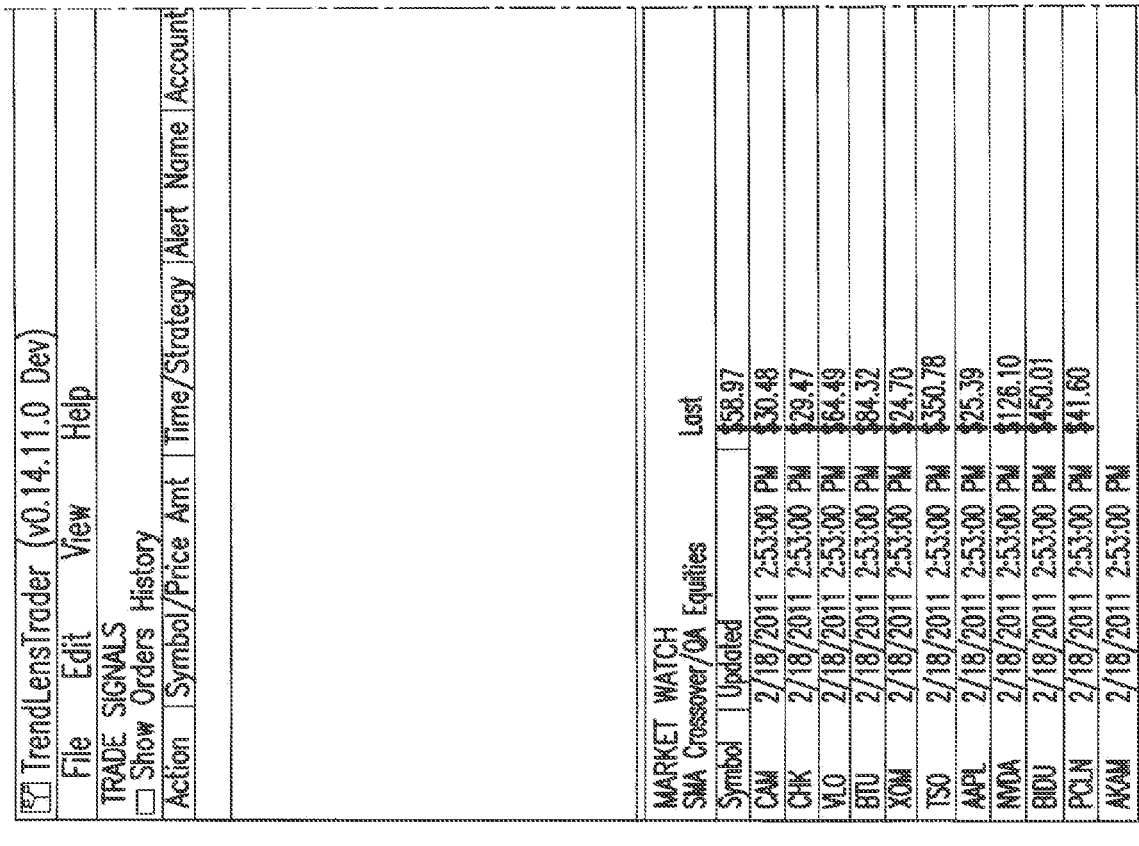
FIGS. 13A-13B illustrate yet another embodiment of the present invention.
Figure 13B:
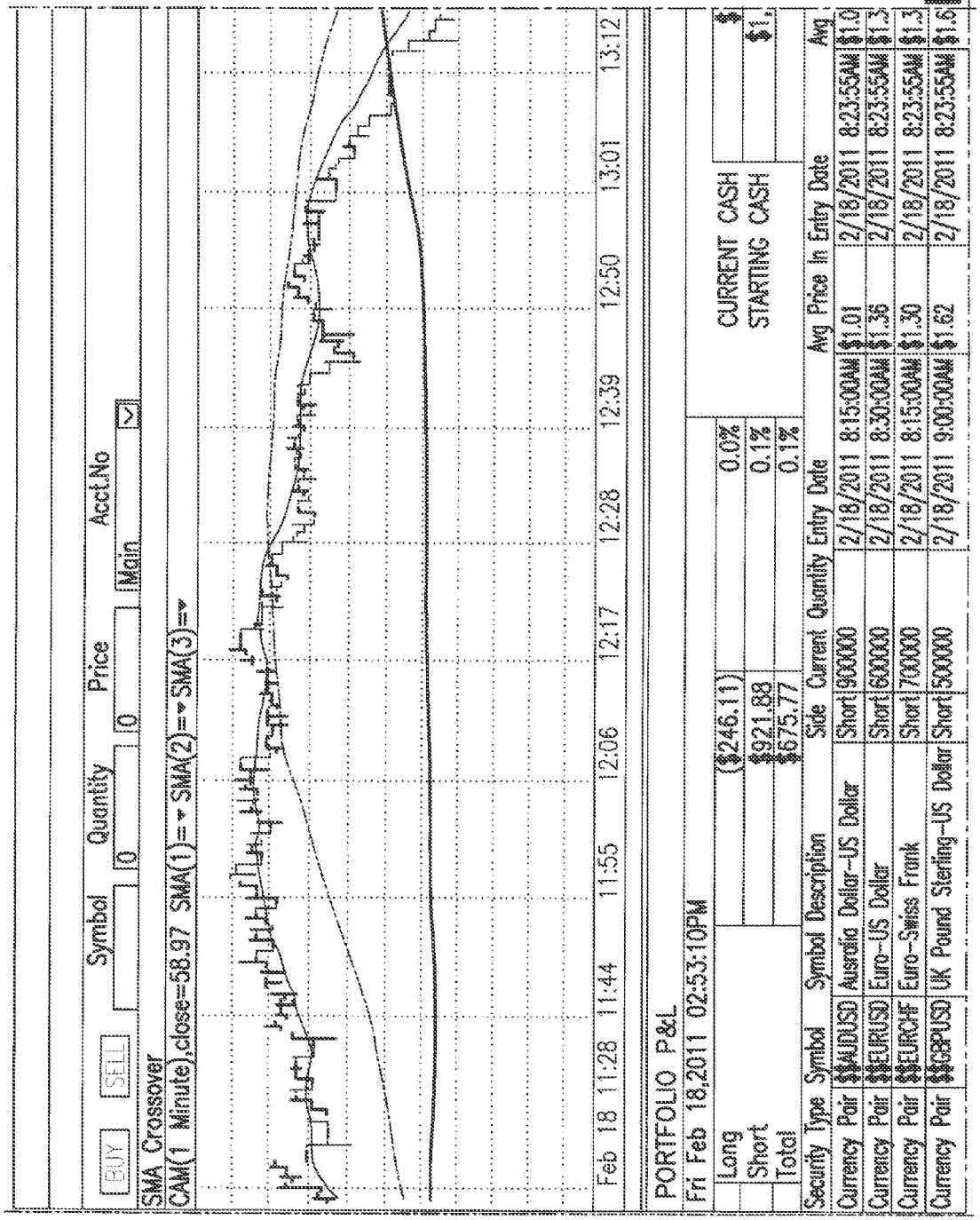

In some embodiments, as shown in FIGS. 13A-13B, the output of running an alert strategy is a list of trading alerts shown in Trend Lens and/or smart charts. In some embodiments, Trend Lens shows trading alerts in a tabular form, whereas smart charts show alerts in a graphical form. In some embodiments, smart charts can be price charts.

Trend Lens

In some embodiments, Trend Lens can consolidate multiple trade signals and alerts in one place. As shown in FIG. 14, in some embodiments, Trend Lens can show trading alerts in a rolling tabular form where each trading alert has one row entry that can show details of the alert (e.g., alert date/time, side, symbol, time-series interval, price, bar date/time at which this alert was triggered, etc.). In some embodiments, a user can click on each alert to view corresponding smart chart(s).

SmartCharts

Figure 15:
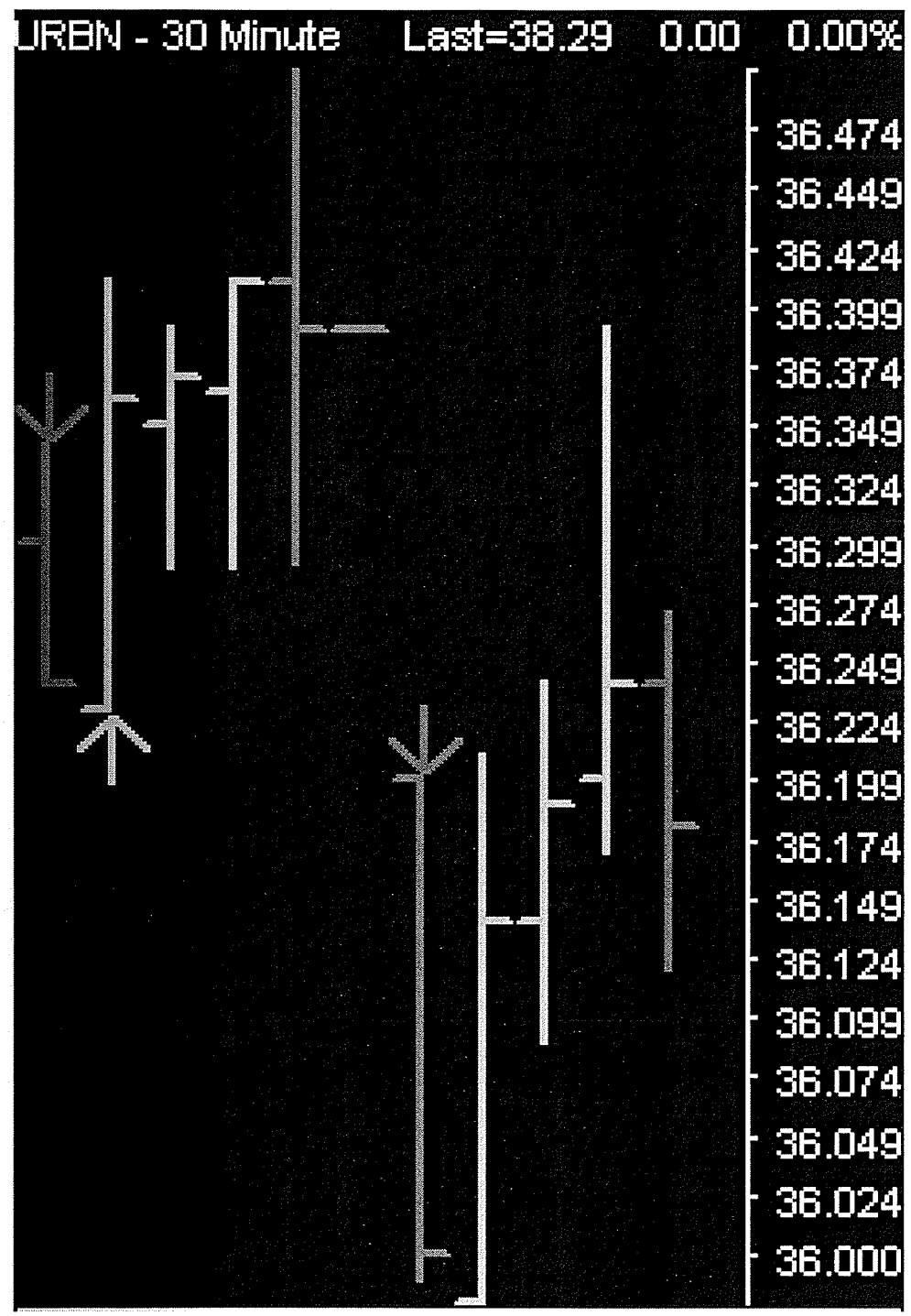
FIG. 15 illustrates yet another embodiment of the present invention.

In some embodiments, smart charts can turn a basic chart into a "smart" one by displaying trade alerts directly on top of the corresponding price bar. In some embodiments, smart charts can displays technical analysis studies used for an alert strategy. For example, if MACD is one of technical indicators used to generate the signal, in some embodiments, a subgraph in the smart chart window can plot MACD chart next to the corresponding price chart. As shown in FIG. 15, in some embodiments, smart charts can show trade alerts in a chart form.

Define Trade Rules

In some embodiments, before an alert strategy can be used for testing, the following three rules may need to be defined:

Allocation rule,
Exit rule, and
Trading Rule.

In some embodiments, allocation rule and/or exit rule can be static, pre-defined rules, while trading rule can be associated with an alert strategy by using its alert in a combination with the static rules.

Symbol Master Editor

Allocation Rule(s)

As shown in FIG. 16, in some embodiments, allocation rule can refer to a capital allocation scheme that determines how much capital to use for each trade.

Exit Rule(s)

Figure 17:
FIG. 17 illustrates yet another embodiment of the present invention.

As shown in FIG. 17, in some embodiments, exit rules, for example, can be for profit-taking or loss-cut based on a position's profit or loss (P/L). In some embodiments, a typical example is the trailing stop which can be viewed as an exit rule that defines when a trading instrument moves again from a more profitable point, such as when a stock price retraces back from its recent high when the trader holds a long position.

FIG. 17 shows an example or an exit rule which is the 5% trailing stop. Another example of exit rule is the stop loss rule. FIG. 17 also shows a double-criteria stop loss rule which can consist of a "1st Hard Stop Loss %" and a "2nd Hard Stop Loss %"—i.e., Exit the position when the loss reaches 1%, or if the current position has already achieved a 1% gain, exit when the gain is gone (i.e., 0% loss).

Trading Rule(s)

Figures 18, 19, 20:
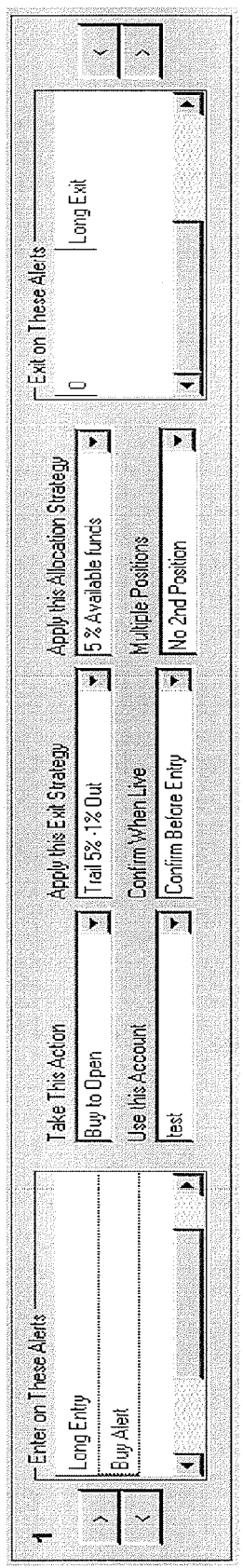
FIG. 18 illustrates yet another embodiment of the present invention.
FIG. 19 illustrates yet another embodiment of the present invention.
FIG. 20 illustrates yet another embodiment of the present invention.

In some embodiments, a trading rule can specify the criteria used to open or close a position. In some embodiments, criteria used for trading rule(s) can include static alerts that are generated by an alert strategy and/or static exit rule(s). In some embodiments, for a trading action (such as buy-to-open, short-to-open, buy-to-close, sell-to-close, etc.) a user can choose the trigger of this action. As shown in FIG. 18, in some embodiments, a trader can define a trading rule by choosing to enter a long position by taking the "Buy to Open" action on a "Buy Alert".

Accounts

In some embodiments, the instant invention can accommodate multiple accounts of which each one has its own start balance and running balance. In some embodiments, for each account, its open position value, current profit and loss, and percentage of return can be updated on a real-time basis. In some embodiments, a user can select one account from the account list to proceed with back-testing.

Back Testing

The Test Tab

In some embodiments, user can use the Test tab 307, as shown in FIG. 3, to set up a back-test. In some embodiments, the back-test can use the current strategy and run it against trading instruments selected.

Results of a Back-Test

In some embodiments, after an alert strategy has been run and trading rules and account have been set, a user can run a back-test on a portfolio that has been set up by selecting more than one trading instrument. In some embodiments, the invention can then apply trade alert(s) and trading rules( ) against the chosen account for a period specified for the price history. As shown in FIG. 19, in some embodiments, the output of the back-testing can be a trade list with P&L information. As shown in FIG. 20, in some embodiments, aggregated P&L, cash balance and other information at account level can be shown in the account list.

In some embodiments, back-testing can be done when live data feed is turned off (e.g., after market-hours when there is no or at least minimum live trading.)

Live Monitor

In some embodiments, the instant invention allows a user to turn on Live Mode at the click of a switch button. In some embodiments, Live mode and Back-test mode cannot be run at the same time. In some embodiments, there is a switch that allows a user to toggle between the two modes so that live market data is turned on or off depending on the mode.

Inputs

In some embodiments, Live market data can come in real-time from a market data server application or any other suitable source of real-time market data. In some embodiments, Live market data can from non-public real-time market data.

Events Flow

In some embodiments, a market data server application or any other suitable source of real-time market data feeds the data.

In some embodiments, calculation of the indicators and/or other strategy components can be triggered when the data needed is complete, for example, when the last bar of the smallest time-interval is closed.

Output

In some embodiments, the output can be displayed on a rolling tabular form on which new alerts can be shown immediately once they are generated. In some embodiments, the alert can detail the time, the trigger values, the triggering indicator or rules, and/or the instrument. In some embodiments, a user can click on the alert entry to view smart charts that can depict the price charts, the indicators, and/or alert marks showing the trade alerts.

Library

In some embodiments, a library includes available strategy components, such as time series, indicators, filters and formations, and/or trade alerts. In some embodiments, the library can be expanded by user customization. In some embodiments, a user can incorporate 3rd party technical analysis libraries and/or make those libraries accessible from the Strategy Designer tool. In some embodiments, a user can combine existing indicators and create new ones as addition to the library.

In some embodiments, the instant invention includes a computer-implemented method that includes steps of: providing, by a computer system, a plurality of pre-programmed components, wherein the plurality of pre-programmed components comprising at least one pre-programmed software component from each of the following types of pre-programmed components: i) a time series component, ii) a technical indicator component, and iii) an alert component, wherein each alert component represents either buy or sell opportunity; receiving, by a computer system, at least one alert strategy, wherein the at least one alert strategy represents a strategy diagram made on a computer screen from the plurality of provided pre-programmed components, having at least: i) at least one time series component, ii) at least one technical indicator component, and iii) at least one alert component; validating, by a computer system, the at least one alert strategy, wherein the validation includes: i) generating, real-time, at least one smart chart for the at least one alert strategy, wherein the at least one smart chart is an output chart that is associated with the at least one alert strategy and is based, at least in part, on the at least one technical indictor component which is used in the at least one alert strategy; receiving, by a computer system, a selection of at least one trading instrument for which the at least one alert strategy to be executed; executing, by a computer system, the at least one alert strategy for the at least one trading instrument, wherein the execution of the at least one alert strategy is based, at least in part, on one of: i) historical market data for the at least one trading instrument and/or ii) real-time market data for the at least one trading instrument from a pluralities of trading venues, wherein the execution of the at least one alert strategy automatically reflected in the at least one generated smart chart; and generating, by a computer system, at least one buy/sell alert when the execution of the alert strategy meets at least one condition pre-determined by the at least one alert strategy.

In some embodiments, the method can further include a step of submitting, by a computer system, a trade based on the at least one buy/sell alert.

In some embodiments, the at least one alert strategy further includes at least one technical indicator composite component, wherein the at least one technical indicator composite component comprising a plurality of technical indicators.

In some embodiments, the plurality of provided pre-programmed components further comprising at least one formation component, wherein the at least one formation component defines a conditional relationship between a plurality of technical indicator components, and wherein the at least one formation component is capable of receiving a plurality of inputs from a plurality of pre-programmed components and providing a plurality of outputs.

In some embodiments, the at least one alert strategy is a result of an visual arrangement of the plurality of provided pre-programmed components, further comprising at least one formation component.

In some embodiments, the at least one buy/sell alert is displayed on top of the corresponding price bar in the at least one generated smart chart.

In some embodiments, the at least one generated smart chart further includes at least one embedded chart for the at least one technical indicator used in the at least one alert strategy.

In some embodiments, the at least one generated smart chart further incudes at least one technical analysis study generated for the at least one alert strategy.

In some embodiments, the method can further include a step of dynamically modifying the at least one generated chart when receiving at least one change to the at least one generated smart chart, wherein the at least one change represents adding at least one technical indicator which is not used in the at least one alert strategy.

In some embodiments, the alert component is capable of receiving a plurality of inputs from a plurality of technical indicator components.

In some embodiments, the instant invention includes a computer system that includes: i) memory having at least one region for storing computer executable program code; and ii) a processor for executing the program code stored in the memory, wherein the program code that includes: software code to provide a plurality of pre-programmed components, wherein the plurality of pre-programmed components comprising at least one pre-programmed software component from each of the following types of pre-programmed components: 1) a time series component, 2) a technical indicator component, and 3) an alert component, wherein each alert component represents either buy or sell opportunity; software code to receive at least one alert strategy, wherein the at least one alert strategy represents a strategy diagram made on a computer screen from the plurality of provided pre-programmed components, having at least: 1) at least one time series component, 2) at least one technical indicator component, and 3) at least one alert component; software code to validate the at least one alert strategy, wherein the validation comprising 1) software code to generate, real-time, at least one smart chart for the at least one alert strategy, wherein the at least one smart chart is an output chart that is associated with the at least one alert strategy and is based, at least in part, on the at least one technical indictor component which is used in the at least one alert strategy; software code to receive a selection of at least one trading instrument for which the at least one alert strategy to be executed; software code to execute the at least one alert strategy for the at least one trading instrument, wherein the execution of the at least one alert strategy is based, at least in part, on one of: i) historical market data for the at least one trading instrument and/or ii) real-time market data for the at least one trading instrument from a pluralities of trading venues, wherein the execution of the at least one alert strategy automatically reflected in the at least one generated smart chart; and software code to generate at least one buy/sell alert when the execution of the alert strategy meets at least one condition pre-determined by the at least one alert strategy.

Examples of Operating Environments

Figure 21:
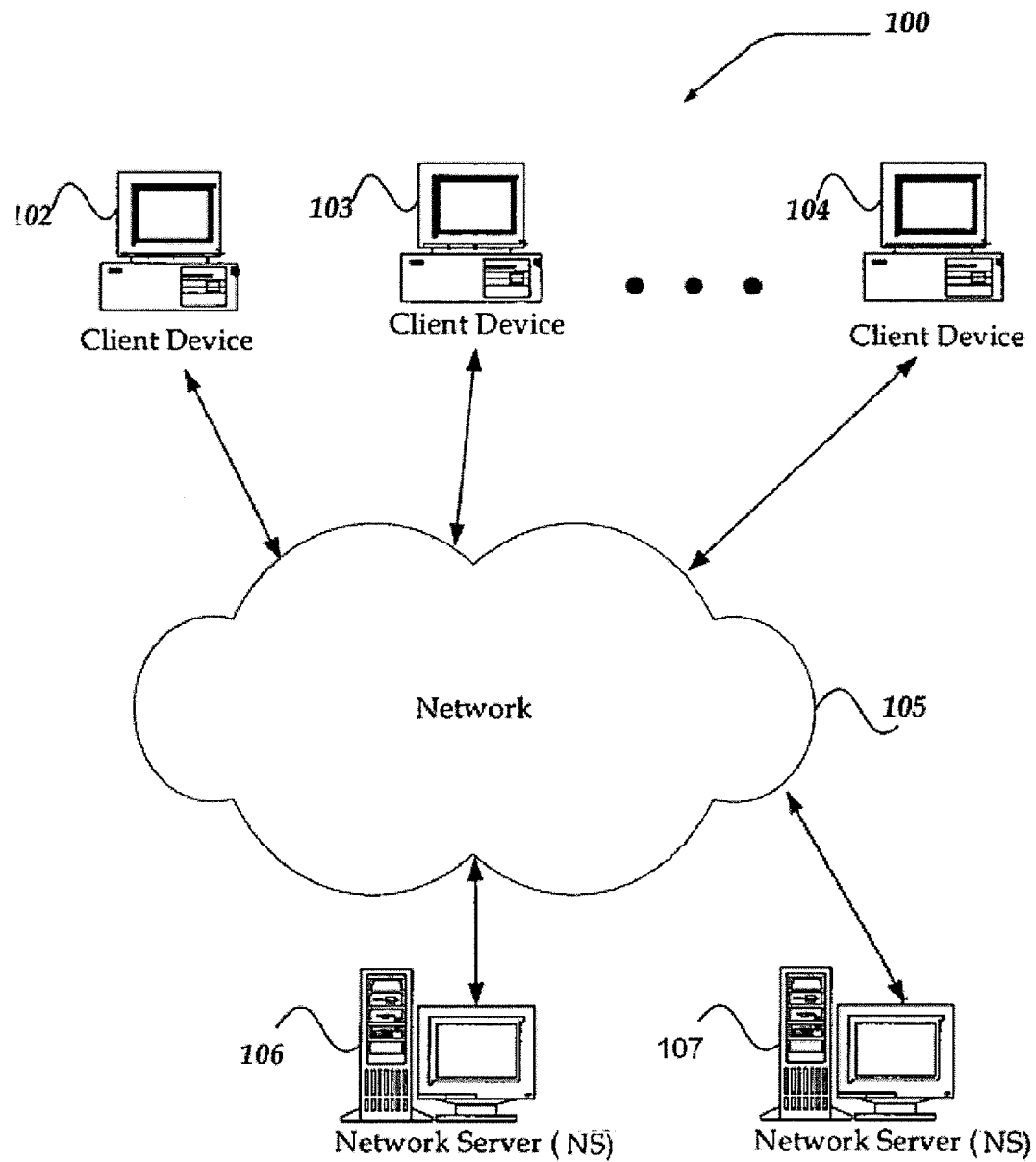
FIG. 21 illustrates yet another embodiment of the present invention.

FIG. 21 illustrates one embodiment of an environment in which the present invention may operate. However, not all of these components may be required to practice the invention, and variations in the arrangement and type of the components may be made without departing from the spirit or scope of the invention. In some embodiment, the visual designing system hosts a large number of members and concurrent transactions. In other embodiments, the visual designing system computer is based on a scalable computer and network architecture that incorporates varies strategies for assessing the data, caching, searching, and database connection pooling. An example of the scalable architecture is an architecture that is capable of operating multiple servers.

In embodiments, members of the inventive computer system 102-104 (e.g. user (e.g. traders etc.) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the invention is programmed in either Java or .Net.

In embodiments, member devices 102-104 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 105 may be configured to couple one computing device to another computing device to enable them to communicate. In embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 22:
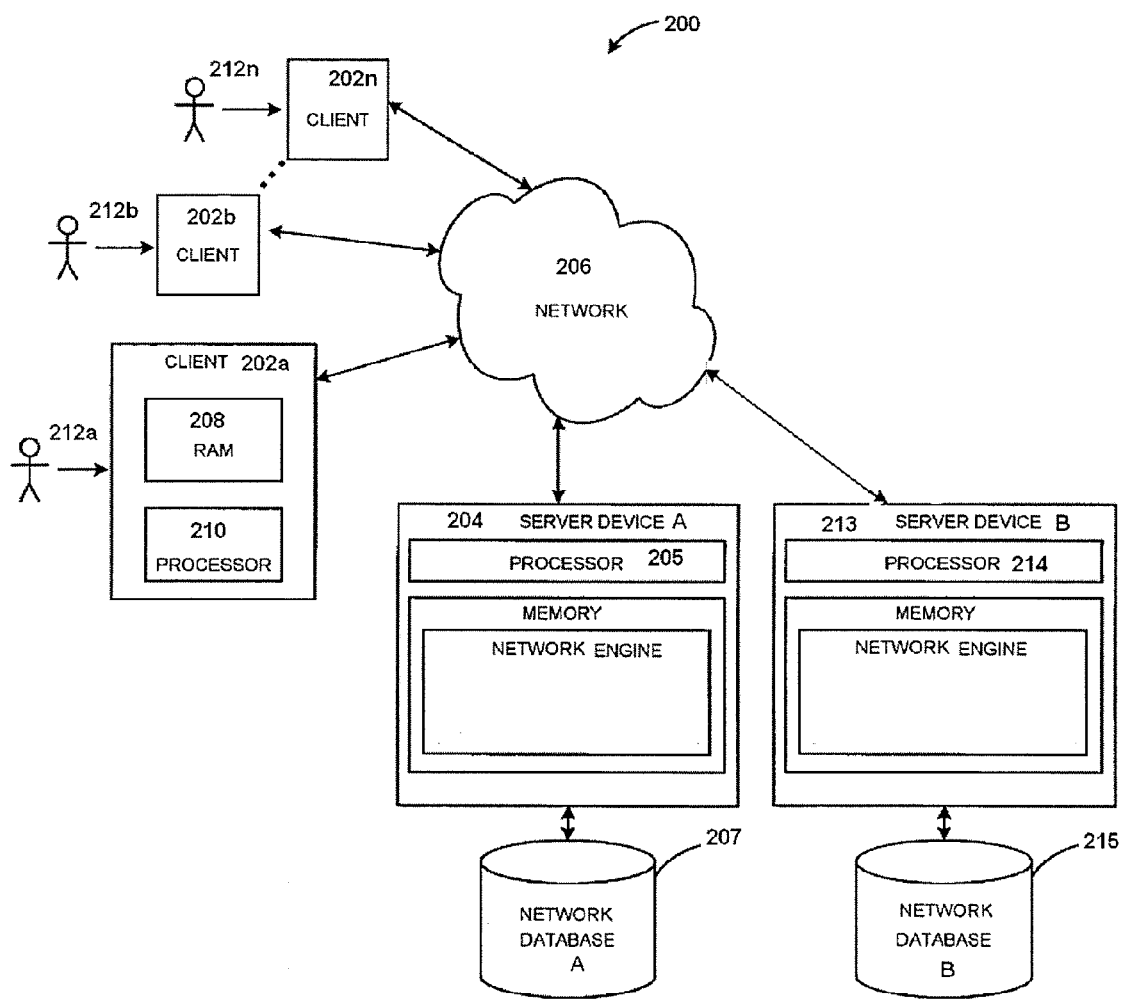
FIG. 22 illustrates yet another embodiment of the present invention.

FIG. 22 shows another exemplary embodiment of the computer and network architecture that supports the inventive visual designing system. The member devices 202a, 202b thru 202n shown (e.g. traders' desktops) each comprises a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a are be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer, Inc.'s Safari™, Mozilla Firefox, and Opera.

Through the client devices 202a-n, users (e.g. traders, etc.) 212a-n communicate over the network 206 with each other and with other systems and devices coupled to the network 206. As shown in FIG. 22, server devices 204 and 213 may be also coupled to the network 206.

While a number of embodiments of the present invention have been described, it is understood that these embodiments are illustrative only, and not restrictive, and that many modifications may become apparent to those of ordinary skill in the art. For example, certain methods may have been described herein as being "computer implementable" or "computer implemented". In this regard, it is noted that while such methods can be implemented using a computer, the methods do not necessarily have to be implemented using a computer. Also, to the extent that such methods are implemented using a computer, not every step must necessarily be implemented using a computer. Further still, the various steps may be carried out in any desired order (and any desired steps may be added and/or any desired steps may be eliminated).

What is claimed is:

1. A computer-implemented method, comprising:
electronically causing to provide, by a specifically programmed trading computer system, over a computer network, at a graphical user interface of each trading computer of a plurality of trading computers, a plurality of pre-programmed software components, wherein the plurality of pre-programmed software components comprising at least one pre-programmed software component from each of the following types of pre-programmed software components:
i) a time series pre-programmed software component,
ii) a technical indicator pre-programmed software component, and
iii) a trading alert pre-programmed software component, wherein each trading alert pre-programmed software component represents either a buy trading opportunity or a sell trading opportunity;
electronically receiving, by the specifically programmed trading computer system, at least one alert trading strategy, wherein the at least one trading alert strategy represents a trading strategy diagram made, utilizing the graphical user interface, from the plurality of provided pre-programmed software components, having at least:
i) at least one time series rammed software component,
ii) at least one technical indicator pre-programmed software component, and
iii) at least one trading alert pre-programmed software component;
automatically validating, by the specifically programmed trading computer system, the at least one trading alert strategy, wherein the validating comprises:
i) automatically generating, in real-time, at least one computer interactive trading chart for the at least one trading alert strategy, wherein the at least one computer interactive trading chart is based, at least in part, on the at least one technical indictor pre-programmed software component which represents at least one technical indicator being used in the at least one trading alert strategy;
electronically receiving, by the specifically programmed trading computer system, a selection of at least one trading instrument for which the at least one trading alert strategy to be executed;
automatically executing, in real-time, by the specifically programmed trading computer system, the at least one trading alert strategy for the at least one trading instrument, wherein the execution of the at least one trading alert strategy is based, at least in part, on one of:
i) historical market data for the at least one trading instrument and/or
ii) real-time market data for the at least one trading instrument from a pluralities of trading venues;
automatically updating, in real-time, by the specifically programmed trading computer system, the at least one computer interactive trading chart on the graphical user interface upon the execution of the at least one trading alert strategy; and
automatically generating, by the specifically programmed trading computer system, at least one buy/sell trading alert when the execution of the trading alert strategy meets at least one condition pre-determined by the at least one trading alert strategy.

2. The method of claim 1, wherein the method further comprising a step of electronically and automatically submitting, by the specifically programmed trading computer system, at least one trade based on the at least one buy/sell trading alert.

3. The method of claim wherein the at least one trading alert strategy further comprising at least one technical indicator composite pre-programmed software component, wherein the at least one technical indicator composite pre-programmed software component comprising a plurality of technical indicator pre-programmed softly components.

4. The method of claim 1, wherein the plurality of provided pre-programmed software components further comprising at least one formation pre-programmed software component, wherein the at least one formation pre-programmed software component defines at least one conditional relationship between a plurality of technical indicator pre-programmed software components, and wherein the at least one formation pre-programmed software component is capable of receiving a plurality of inputs from a plurality of pre-programmed software components and providing a plurality of outputs.

5. The method of claim 4, wherein the at least one alert strategy is a result of a visual arrangement of the plurality of provided pre-programmed software components, further comprising at least one formation pre-programmed software component.

6. The method of claim 1, wherein the at least one buy/sell trading alert is displayed on a top of a corresponding price bar in the at least one computer interactive trading chart.

7. The method of claim 1, wherein the at least one computer interactive trading chart further comprising at least one embedded computer interactive trading chart tier the at least one technical indicator being used in the at least one trading alert strategy.

8. The method of claim 1, wherein the at least one computer interactive trading chart further comprising at least one technical analysis study which is automatically generated, by the specifically programmed trading computer system, for the at least one trading alert strategy.

9. The method of claim 1, wherein the method further comprising a step of automatically and dynamically modifying, by the specifically programmed trading computer system, the at least one computer interactive trading chart when receiving at least one change to the at least one computer interactive trading chart, wherein the at least one change represents adding at least one technical indicator pre-programmed software component which is not used in the at least one trading alert strategy.

10. The method of claim 1, wherein the at least one trading alert component is capable of receiving a plurality of inputs from a plurality of technical indicator pre-programmed software components.

11. The method of claim 1, wherein the steps are performed in the recited order.

12. A specifically programmed trading computer system, comprising
  i) memory having at least one region for storing specialized computer executable program code; and
  ii) at least one processor for executing the specialized computer executable program code stored in the memory, wherein the specialized computer executable program code comprising:
  software code electronically cause to provide, over a computer network, at a graphical user interface of each trading computer, a plurality of pre-programmed software components,
  wherein the plurality of pre-programmed software components comprising at least one pre-programmed software component from each of the following types of pre-programmed software components:
  i) a time series pre-programmed software component,
  ii) a technical indicator pre-programmed software component, and
  iii) trading alert pre-programmed software component, wherein each trading alert pre-programmed software component represents either a buy trading opportunity or a sell trading opportunity;
  software code to elect electronically deceive at least one alert trading strategy, wherein the at least one trading alert strategy represents a trading strategy diagram made, utilizing the graphical user interface, from the plurality of provided pre-programmed software components, having at least:
    1) at least one time series pre-programmed software component,
    2) at least one technical indicator pre-programmed software component, and
    3) at least one trading alert pre-programmed software component;
  software code to automatically validate the at least one trading alert strategy, wherein the validation comprises:
    i) automatically generating, in real-time, at least one computer interactive trading chart for the at least one trading alert strategy, wherein the at least one computer interactive trading chart is based, at least in part, on the at least one technical indictor pre-programmed software component which represents at least one technical indicator being is used in the at least one trading alert strategy;
  software code to electronically receive a selection of at least one trading instrument for which the at least one trading alert strategy to be executed;
  software code to automatically execute, in real-time, the at least one trading alert strategy for the at least one trading instrument, wherein the execution of the at least one trading alert strategy is based, at least in part, on one of:
    i) historical market data for the at least one trading instrument and/or
    ii) real-time market data for the at least one trading instrument from a pluralities of trading venues;
  software code to automatically update, in real-time, the at least one computer interactive trading chart on the graphical user interface upon the execution of the at least one trading alert strategy; and
  software code to automatically generate at least one buy/sell trading alert when the execution of the trading alert strategy meets at least one condition pre-determined by the at least one trading alert strategy.

13. The system of claim 12, wherein the system further comprising software code to electronically and automatically submit at least one trade based on the at least one buy/sell trading alert.

14. The system of claim 12, wherein the at least one trading alert strategy further comprising at least one technical indicator composite pre-programmed software component, wherein the at least one technical indicator composite pre-programmed software component comprising a plurality of technical indicator pre-programmed software components.

15. The system of claim 12, wherein the plurality of provided pre-programmed software components further comprising at least one formation pre-programmed software component, wherein the at least one formation pre-programmed software component defines at least one conditional relationship between a plurality of technical indicator pre-programmed software components, and wherein the at least one formation pre-programmed software component is capable of receiving a plurality of inputs from a plurality of pre-programmed software components and providing a plurality of outputs.

16. The system of claim 15, wherein the at least one alert strategy is a result of a visual arrangement of the plurality of provided pre-programmed software components, further comprising at least one formation pre-programmed software component.

17. The system of claim 12, wherein the at least one buy/sell trading alert is displayed on a top of a corresponding price bar in the at least one computer interactive trading chart.

18. The system of claim 12, wherein the at least one computer interactive trading chart further comprising at least one embedded computer interactive trading chart for the at least one technical indicator being used in the at least one trading alert strategy.

19. The system of claim 12, wherein the at least one computer interactive trading chart further comprising at least one technical analysis study which is automatically generated, by the specifically programmed trading computer system, for the at least one trading alert strategy.

20. The system of claim 12, wherein the system further comprising software code to automatically and dynamically modify the at least one computer interactive trading chart when receiving at least one change to the at least one computer interactive trading chart, wherein the at least one change represents adding at least one technical indicator pre-programmed software component which is not used in the at least one trading alert strategy.

21. The system of claim 12, wherein the at least one trading alert component is capable of receiving a plurality of inputs from a plurality of technical indicator pre-programmed software components.

* * * * *